(12) United States Patent
Yamano

(10) Patent No.: US 8,169,710 B2
(45) Date of Patent: May 1, 2012

(54) ZOOM LENS AND IMAGE CAPTURE APPARATUS

(75) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 250 days.

(21) Appl. No.: 12/654,089

(22) Filed: Dec. 10, 2009

(65) Prior Publication Data

US 2010/0172030 A1 Jul. 8, 2010

(30) Foreign Application Priority Data

Jan. 6, 2009 (JP) .................................. 2009-000784

(51) Int. Cl.
*G02B 15/14* (2006.01)

(52) U.S. Cl. .................... 359/680; 359/686; 348/240.99; 396/72

(58) Field of Classification Search .................. 359/676, 359/680, 686; 348/240.99–240.3, 335–369; 396/72–88

See application file for complete search history.

(56) References Cited

U.S. PATENT DOCUMENTS

2007/0070517 A1* 3/2007 Harada .......................... 359/680
2010/0073778 A1* 3/2010 Hirakawa ...................... 359/684

FOREIGN PATENT DOCUMENTS

| JP | 2006-078581 | | 3/2006 |
| JP | 2008-191385 | | 8/2008 |
| JP | 2008-197176 | A | 8/2008 |

* cited by examiner

*Primary Examiner* — Darryl J Collins
(74) *Attorney, Agent, or Firm* — Rader Fishman & Grauer, PLLC

(57) ABSTRACT

An image capture apparatus includes: a zoom lens; and an image pickup device converting an optical image formed by the zoom lens into an electric signal. The zoom lens includes, in order from the object side, a first lens group with a negative focal length, a second lens group with a positive focal length, a third lens group with a negative focal length, and a fourth lens group with a positive focal length. During zooming from a wide-angle end to a telephoto end, the first lens group moves along a locus having a convex shape toward an image side while decreasing an air space between the first and second lens groups, and the second and third lens groups move toward the object side while increasing an air space therebetween.

14 Claims, 11 Drawing Sheets

-------- RADIUS OF CURVATURE OF CENTER PORTION
—·—·— RADIUS OF CURVATURE OF MARGINAL PORTION

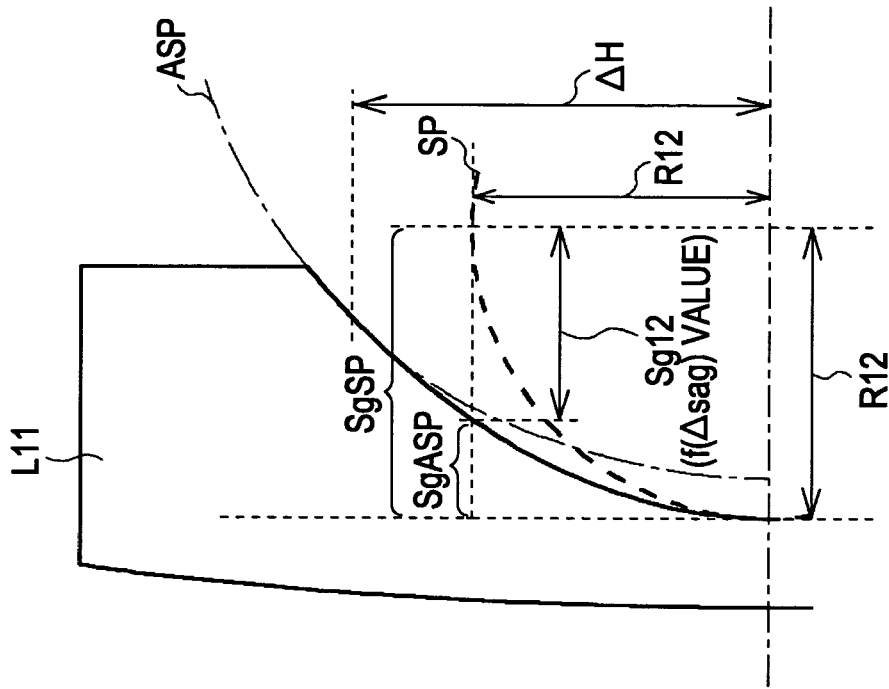
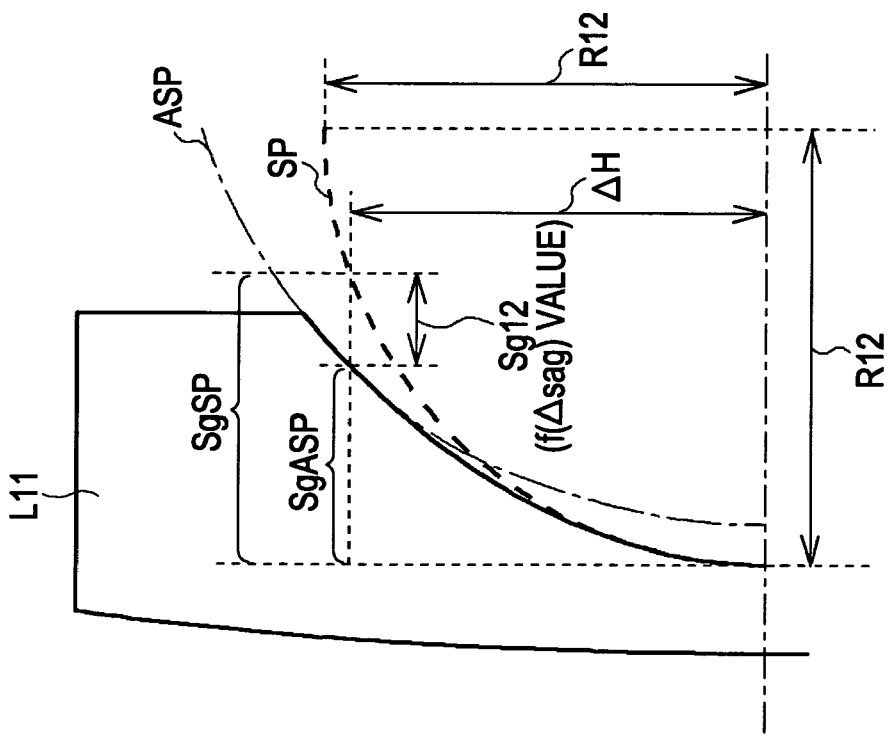

ZOOM LENS AND IMAGE CAPTURE APPARATUS

BACKGROUND OF THE INVENTION

1. Technical Field

The present invention relates to a zoom lens and an image capture apparatus. In particular, the invention relates to, for example, a zoom lens, which is suitable for a digital still camera, a digital video camera, a surveillance camera, or the like while having a high zoom magnification power and being able to achieve an increase in imaging field angle sufficiently, and an image capture apparatus using the zoom lens.

2. Description of the Related Art

Recently, as the digital still camera market has become very large, users have varied demands for digital still cameras. To say nothing of an increase in image quality, a decrease in size, and a decrease in thickness, demand for an increase in the magnification of the image taking lens and an increase in the angle of view has also become very strong.

Generally, there is a negative lead type zoom lens of which a lens group closest to the object side has a negative refractive power. Since it is easy for the negative lead type zoom lens to decrease a diameter of a front lens, it is advantageous in reduction of size. Hence, the negative lead type zoom lens has been widely used as a type suitable for increasing the angle of view.

Further, in image capture apparatuses using the solid-state image pickup device, it is preferable to use a zoom lens which is telecentric on the image side in that the zoom lens is able to make image field intensity uniform. In such a zoom lens, it is preferable that the lens group closest to the image side should have a positive refractive power.

As a zoom lens which is a negative lead type and of which the lens group closest to the image side has a positive refractive power, there has been proposed a four group zoom lens which includes four lens groups of negative, positive, negative, and positive refractive powers arranged in order from the object side to the image side (for example, refer to Japanese Unexamined Patent Application Publication No. 2008-191385).

On the other hand, as a negative lead type zoom lens, there has also been proposed a small zoom lens which includes three lens groups of negative, positive, and positive refractive powers arranged in order from the object side to the image side (for example, refer to Japanese Unexamined Patent Application Publication No. 2006-78581).

SUMMARY OF THE INVENTION

However, similarly to the zoom lens having the four-group configuration disclosed in Japanese Unexamined Patent Application Publication No. 2008-191385 mentioned above, most of the lenses have a zoom ratio as small as a zoom magnification power of 4 to 5 times or so and an imaging field angle as small as a half angle of view of 38° or so. Nowadays, there has not yet been invented a zoom lens which is capable of achieving both a high magnification ratio and a wide angle and which has a small size and a high image quality.

Further, similarly to the zoom lens having the three-group configuration disclosed in Japanese Unexamined Patent Application Publication No. 2006-78581 mentioned above, most of the lenses have a zoom ratio of three times or so, and it is hard for the lenses to achieve a sufficient zoom ratio above that.

Generally, to achieve a wide angle and a high magnification power, it is necessary to correct aberrations satisfactorily, and thus the number of necessary lens elements increases. Accordingly, recently there has been demand for a downsized zoom lens capable of achieving a wide angle and a high magnification power and satisfactorily correcting aberrations.

In view of the above issues, it is desirable to provide a zoom lens, which is suitable for an image capture apparatus using a solid-state image pickup device as an image pickup means while being compact and having a high optical performance throughout the entire zoom range, and an image capture apparatus using the zoom lens.

According to an embodiment of the invention, a zoom lens includes, in order from the object side: a first lens group with a negative focal length; a second lens group with a positive focal length; a third lens group with a negative focal length; and a fourth lens group with a positive focal length. During zooming from a wide-angle end to a telephoto end, the first lens group moves along a locus having a convex shape toward an image side while decreasing an air space between the first and second lens groups, and the second and third lens groups move toward the object side while increasing an air space therebetween. A surface closest to the object side in the second lens group is convex toward the object side and is aspheric, and the second lens group includes a cemented lens formed of a negative meniscus lens convex toward the object side and a positive lens. The cemented lens of the second lens group satisfies the following conditional expression (1).

$$0.3 < R_{CL}/f2 < 1.0. \qquad (1)$$

Here, $R_{CL}$ is a radius of curvature of the cemented surface of the cemented lens constituting the second lens group, and f2 is a focal length of the second lens group.

The conditional expression (1) defines a radius of curvature of the cemented surface of the cemented lens. When the result value of the expression exceeds the upper limit, the radius of curvature of the cemented surface becomes too gentle. In this case, it is difficult to correct longitudinal chromatic aberration and chromatic coma aberration (difference of colors in coma aberration) on the cemented surface. Hence, this case is undesirable.

In contrast, in the conditional expression (1), when the result value of the expression exceeds the lower limit, the radius of curvature of the cemented surface becomes too strong. In this case, as the refractive power thereof increases, the occurrence of longitudinal chromatic aberration and chromatic coma aberration in the second lens group excessively increases, thereby causing deterioration in image quality.

Here, the lens surface closest to the object side in the second lens group strongly refracts off-axis principal rays exiting from the first lens group. Hence, there is adopted an arrangement by which the lens surface is convex toward the object side so as not to cause various off-axis aberrations. Further, this arrangement is also preferable in order to suppress the occurrence of spherical aberration of the on-axis rays diverged from the first lens group and the occurrence of coma aberration of the off-axis rays.

Further, in the zoom lens, the surface closest to the object side in the second lens group is aspheric. Thereby, the zoom lens is able to correct spherical aberration and coma aberration satisfactorily. As a result, the zoom lens has an advantage in that it is easy to obtain a reliable optical performance even when a high magnification power and a wide angle of the optical system are achieved.

Furthermore, in the zoom lens, in order to correct chromatic aberration satisfactorily, the cemented lens formed of the negative meniscus lens and the positive lens in the second lens group is disposed, and the object side surface of the negative meniscus lens is convex toward the object side. In the zoom lens, by adopting such a configuration, the cemented lens easily satisfies a sine condition. As a result, it is possible to reduce the occurrence of spherical aberration and coma aberration.

Further, in the zoom lens according to the embodiment of the invention, it is preferred that the two lenses constituting the first lens group be configured to satisfy the following conditional expressions (2) and (3).

$$0.3<(R21-R12)/(R12+R21)<0.5, \text{ and} \qquad (2)$$

$$0.1<(|Sg21|+|Sg12|)/|f1|<0.3. \qquad (3)$$

Here, R21 is a paraxial radius of curvature of an object side surface of a positive lens in the first lens group, R12 is a paraxial radius of curvature of an image side surface of a negative lens in the first lens group, f1 is a focal length of the first lens group, f(Δsag) value is a value obtained by subtracting a sag amount of an aspheric shape from a sag amount of a paraxial radius of curvature, Sg21 is an f(Δsag) value at an effective diameter position on the object side surface of the positive lens in the first lens group, and Sg12 is an f(Δsag) value at an effective diameter position on the image side surface of the negative lens in the first lens group.

Furthermore, when the effective diameter position on the image side surface of the negative lens in the first lens group is larger than R12, the Sg12 is an f(Δsag) value at a position radially spaced at a distance (corresponding to R12) from an optical axis.

As described above, in the zoom lens according to the embodiment of the invention, when the effective diameter position on the image side surface of the negative lens in the first lens group is larger than R12, the Sg12 is approximate to an f(Δsag) value at a position radially spaced at a distance (corresponding to R12) from an optical axis.

The conditional expression (2) defines a shape factor of an air lens formed between the two lenses of the first lens group. In the conditional expression (2), when the result value of the expression becomes smaller than the lower limit, the curvatures of the surfaces of the air lens become gentle. Thereby, the refractive power thereof decreases, and thus it becomes difficult to downsize the optical system.

Further, in the conditional expression (2), when the result value of the expression exceeds the lower limit, incident angles of rays incident from the object side to the air lens in the vicinity of maximum angle of view tend to increase. Hence, it becomes difficult to correct various off-axis aberrations while achieving an increase in the imaging field angle.

In contrast, in the conditional expression (2), when the result value of the expression becomes larger than the upper limit, the curvatures of the surfaces of the air lens become too strong. Hence, the occurrence of off-axis aberration increases on the wide-angle end side, and the occurrence of on-axis aberration increases on the telephoto end side. Moreover, it becomes difficult to secure an edge thickness of the positive lens of the first lens group and reduce the sensitivity to eccentricity. Hence, the productivity at the time of manufacturing a zoom lens barrel deteriorates.

The conditional expression (3) defines aspheric shapes formed on the image side surface of the negative lens and the object side surface of the positive lens in the first lens group. In the conditional expression (3), when the result value of the expression exceeds the lower limit, it means that the aspheric shapes of both surfaces of the air lens formed between the negative lens and the positive lens approximate to the spherical surface. In this case, since the correction effect of the aspheric lenses in the first lens group is lost, various off-axis aberrations excessively increase, and, particularly, it becomes difficult to correct astigmatism at the wide-angle end, thereby causing deterioration in optical performance.

Further, in the conditional expression (3), when the result value of the expression exceeds the upper limit, the various aberrations are corrected too much by the aspheric shapes, and thus it becomes difficult to perform the aberration correction based on the first lens group. Moreover, the sensitivity to eccentricity also increases, and thus it becomes difficult to manufacture the zoom lens barrel.

Furthermore, it is preferred that the zoom lens according to an embodiment of the invention should have a simple configuration in which the third lens group includes only a cemented lens formed to have a negative refractive power as a whole by cementing a positive lens and a negative lens in order from the object side. With such a configuration, it is possible to downsize the optical system.

In this case, it is preferred that the third lens group be configured to satisfy the following conditional expressions (4) and (5).

$$\nu 3p>45, \qquad (4)$$

$$10<\nu 3p-\nu 3n<30, \text{ and} \qquad (5)$$

$$1.0<(R3a+R3b)/(R3a-R3b)<6.0, \qquad (6)$$

Here, ν3p is an Abbe number of the positive lens constituting the cemented lens of the third lens group, ν3n is an Abbe number of the negative lens constituting the cemented lens of the third lens group, R3a is a radius of curvature of a lens surface closest to the object side in the third lens group, and R3b is a radius of curvature of a lens surface closest to the image side in the third lens group.

The conditional expression (4) defines an Abbe number of a material of the positive lens constituting the third lens group. The conditional expression (5) defines difference between the Abbe number of the positive lens and the Abbe number of the material of the negative lens in the cemented lens.

In the third lens group, the material of the positive lens may be selected so that the lower limit of the conditional expression (4) is exceeded or the cemented lens of the third lens group may be configured so that the upper limit of the conditional expression (5) is exceeded. In these cases, the Abbe number of the material of the negative lens excessively decreases. Hence, these cases are undesirable. Generally, in a glass material having a small Abbe number, dispersion increases together with partial dispersion. Hence, particularly in a high power zoom lens, secondary spectrum (secondary dispersion) on the telephoto side tends to increase.

Further, in the third lens group, the cemented lens may be configured so that the lower limit of the conditional expression (5) is exceeded. In this case, the difference between the Abbe numbers of the positive lens and the negative lens excessively decreases. Therefore, there is no merit in the configuration in which the third lens group includes the cemented lens. Hence, this is undesirable.

The conditional expression (6) defines a shape factor of the third lens group. In the third lens group, when the result value of the expression exceeds the upper limit of the conditional expression (6), the curvature of the lens surface may be too strong. In this case, the tilting of the image plane frequently occurs at the time of vibration absorption based on hand shake correction, thereby causing deterioration in image quality.

Further, in the third lens group, when the result value of the expression exceeds the lower limit of the conditional expression (6), the configuration of the cemented lens is inappropriate. Accordingly, it becomes difficult to correct chromatic aberration in the cemented lens in the third lens group.

In addition, in the zoom lens according to an embodiment of the invention, the image can be shifted by moving (shifting) the third lens group in a direction approximately perpendicular to the optical axis.

In practice, by moving the third lens group in the direction approximately perpendicular to the optical axis, the zoom lens is configured to function as an anti-vibration optical system in combination with a detection system which detects image blur, a driving system which shifts the lens groups, and a control system which provides a shift amount to the driving system on the basis of the output of the detection system.

In particular, since the zoom lens is configured to shift the third lens group, which has a small number of elements and has a small lens diameter, in the direction perpendicular to the optical axis, it is possible to downsize an anti-vibration unit, reduce load on the actuator, and save electric power.

Furthermore, in the zoom lens the third lens group is configured to satisfy the above-mentioned conditional expressions (4) to (6). With such a configuration, it is possible to reduce the occurrence of eccentricity aberration caused when the third lens group is shifted. As a result, it is possible to shift an image with small aberration fluctuation.

Furthermore, in the zoom lens according to an embodiment of the invention, it is preferred that the first lens group be configured to include two elements of a negative lens, of which at least an image side surface is aspheric and a concave surface faces toward the image side, and a positive meniscus lens, of which at least an object side surface is aspheric and a convex surface faces toward the object side, arranged in order from the object side. In addition, it is also preferred that the first lens group should satisfy the following conditional expressions (7) and (8).

$$n_{d12} > 1.9, \text{ and} \quad (7)$$

$$v_{d12} < 22. \quad (8)$$

Here, $n_{d12}$ is a refractive index of the positive meniscus lens constituting the first lens group at the d-line, and $v_{d12}$ is an Abbe number of the positive meniscus lens constituting the first lens group.

The conditional expressions (7) and (8) define a refractive index and an Abbe number of the positive meniscus lens constituting the first lens group.

In the zoom lens, when the result value of the expression exceeds the range of the conditional expression (7), it is necessary to increase the curvature of the positive meniscus lens. Thus, it becomes difficult to correct aberration of image field curvature at the wide-angle end, thereby causing deterioration in optical performance. Further, it also becomes difficult to secure the edge thickness of the lenses, thereby causing difficulty in the manufacture of the lens barrel.

Further, in the zoom lens, when the result value of the expression exceeds the range of the conditional expression (8), it becomes difficult to correct chromatic aberration that occurs in the first lens group. As a result, this causes deterioration in optical performance.

Furthermore, in the zoom lens according to an embodiment of the invention, it is preferred that the two lenses constituting the cemented lens of the second lens group be configured to satisfy the following conditional expression (9). With such a configuration, it is possible to correct further chromatic aberration (longitudinal chromatic aberration, chromatic coma aberration) satisfactorily.

$$40 < v2p - v2n < 70. \quad (9)$$

Here, $v2p$ is an Abbe number of the positive lens constituting the cemented lens in the second lens group, and $v2n$ is an Abbe number of the negative lens constituting the cemented lens in the second lens group.

The conditional expression (9) defines the difference between the Abbe number of the material of the positive lens and the Abbe number of the material of the negative meniscus lens in the cemented lens of the second lens group.

In the zoom lens, the result value of the expression may exceed the upper limit of the conditional expression (9) and excessively increase. In this case, chromatic dispersion increases as the Abbe number of the material of the negative lens excessively decreases, and thus the occurrence of chromatic aberration excessively increases. Hence, this case is undesirable.

Further, in the zoom lens, the result of the expression may exceed the lower limit of the conditional expression (9) and excessively decrease. In this case, the difference between the Abbe numbers of the positive lens and the negative meniscus lens constituting the cemented lens becomes excessively small. Hence, it becomes difficult to correct chromatic aberration.

Furthermore, in the zoom lens according to an embodiment of the invention, it is preferable to perform focusing by moving the first lens group with a negative focal length and fourth lens group with a positive focal length in the optical axis direction.

In particular, by using the fourth lens group as a lens group for focusing, the zoom lens is configured to easily avoid the interference with the driving system which performs driving controls of the shutter unit and the iris unit and the anti-vibration driving system which shifts the third lens group. With such a configuration, the zoom lens can be downsized.

Further, according to another embodiment of the invention, an image capture apparatus includes: a zoom lens; and an image pickup device converting an optical image formed by the zoom lens into an electric signal.

The zoom lens includes, in order from the object side, a first lens group with a negative focal length, a second lens group with a positive focal length, a third lens group with a negative focal length, and a fourth lens group with a positive focal length. During zooming from a wide-angle end to a telephoto end, the first lens group moves along a locus having a convex shape toward an image side while decreasing an air space between the first and second lens groups, and the second and third lens groups move toward the object side while increasing an air space therebetween.

A surface closest to the object side in the second lens group is convex toward the object side and is aspheric, and the second lens group includes a cemented lens formed of a negative meniscus lens convex toward the object side and a positive lens.

The cemented lens of the second lens group satisfies the following conditional expression (1).

$$0.3 < R_{CL}/f2 < 1.0. \quad (1)$$

Here, $R_{CL}$ is a radius of curvature of the cemented surface of the cemented lens constituting the second lens group, and f2 is a focal length of the second lens group.

In the zoom lens of the image capture apparatus, the conditional expression (1) defines a radius of curvature of the cemented surface of the cemented lens. When the result value of the expression exceeds the upper limit, the radius of curvature of the cemented surface becomes too gentle. In this case, it is difficult to correct longitudinal chromatic aberration and chromatic coma aberration (difference of colors in coma aberration) on the cemented surface. Hence, this case is undesirable.

In contrast, in the conditional expression (1), when the result value of the expression exceeds the lower limit, the radius of curvature of the cemented surface becomes too strong. In this case, as a refractive power thereof increases, the occurrence of longitudinal chromatic aberration and chromatic coma aberration in the second lens group excessively increases, thereby causing deterioration in image quality.

According to the embodiment of the invention, the zoom lens includes, in order from the object side: the first lens group with a negative focal length; the second lens group with a positive focal length; the third lens group with a negative focal length; and the fourth lens group with a positive focal length. During zooming from the wide-angle end to the telephoto end, the first lens group moves along a locus having a convex shape toward the image side while decreasing the air space between the first and second lens groups, and the second and third lens groups move toward the object side while increasing the air space therebetween. The surface closest to the object side in the second lens group is convex toward the object side and is aspheric, and the second lens group includes the cemented lens formed of the negative meniscus lens convex toward the object side and the positive lens. The cemented lens of the second lens group satisfies the following conditional expression (1).

$$0.3 < R_{CL}/f2 < 1.0. \tag{1}$$

Here, $R_{CL}$ is a radius of curvature of the cemented surface of the cemented lens constituting the second lens group, and f2 is a focal length of the second lens group.

The zoom lens with such a configuration is suitable for an image capture apparatus using a solid-state image pickup device as image pickup means while achieving a wide angle and a high zoom ratio, being compact, and having a high optical performance in the entire zoom range.

Further, according to another embodiment of the invention, the image capture apparatus includes: the zoom lens; and the image pickup device converting an optical image formed by the zoom lens into an electric signal. The zoom lens includes, in order from the object side: the first lens group with a negative focal length; the second lens group with a positive focal length; the third lens group with a negative focal length; and the fourth lens group with a positive focal length. During zooming from the wide-angle end to the telephoto end, the first lens group moves along a locus having a convex shape toward the image side while decreasing the air space between the first and second lens groups, and the second and third lens groups move toward the object side while increasing the air space therebetween. The surface closest to the object side in the second lens group is convex toward the object side and is aspheric, and the second lens group includes the cemented lens formed of the negative meniscus lens convex toward the object side and the positive lens. The cemented lens of the second lens group satisfies the following conditional expression (1).

$$0.3 < R_{CL}/f2 < 1.0. \tag{1}$$

Here, $R_{CL}$ is a radius of curvature of the cemented surface of the cemented lens constituting the second lens group, and f2 is a focal length of the second lens group.

The zoom lens provided in the image capture apparatus with such a configuration is suitable for an image capture apparatus using a solid-state image pickup device as image pickup means while achieving a wide angle and a high zoom ratio, being compact, and having a high optical performance in the entire zoom range.

BRIEF DESCRIPTION OF THE DRAWINGS

FIG. 2A is schematic diagram illustrating an f(Δsag) value;

FIG. 2B is schematic diagram illustrating an f(Δsag) value;

DESCRIPTION OF THE PREFERRED EMBODIMENTS

Figure 1:
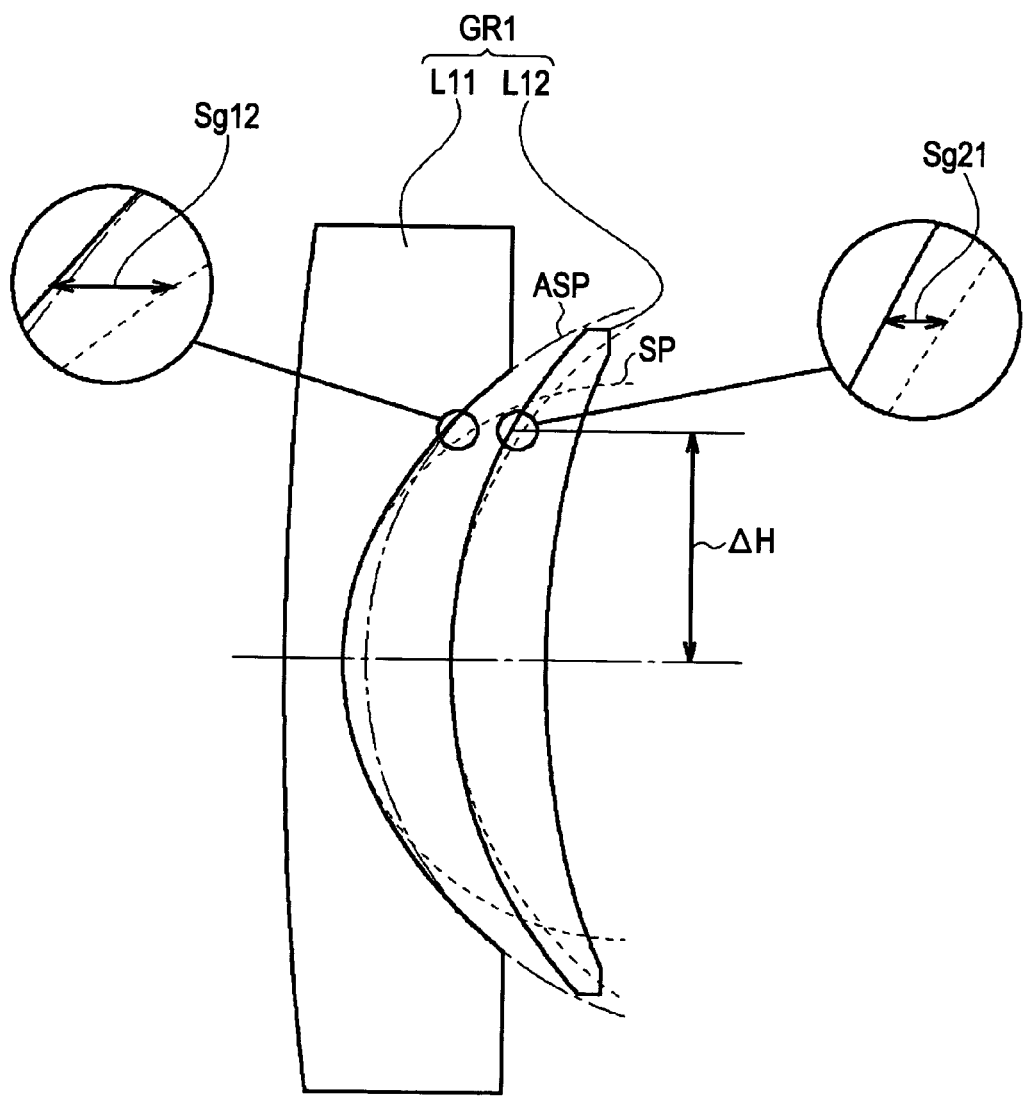
FIG. 1 is a schematic sectional view illustrating the radius of curvatures of surfaces of a first lens group.

Hereinafter, preferred embodiments of the invention (hereinafter, referred to embodiments) will be described. Furthermore, the description will be given in order of the following items.

1. Embodiment (zoom lenses)
2. Numerical examples (first numerical example, second numerical example, and numerical values corresponding to conditional expressions)
3. An image capture apparatus and a digital still camera
4. Other embodiments 1. Embodiment 1-1. Configuration of Zoom Lens A zoom lens according to an embodiment of the invention includes, in order from the object side: a first lens group with a negative focal length; a second lens group with a positive focal length; a third lens group with a negative focal length; and a fourth lens group with a positive focal length.

Specifically, in the zoom lens, during zooming from a wide-angle end to a telephoto end, the first lens group moves along a locus having a convex shape toward an image side while decreasing an air space between the first and second lens groups, and the second and third lens groups move toward the object side while increasing an air space therebetween. A surface closest to the object side in the second lens group is convex toward the object side and is aspheric, and the second lens group includes a cemented lens formed of a negative meniscus lens convex toward the object side and a positive lens.

Here, the lens surface closest to the object side in the second lens group strongly refracts off-axis principal rays exiting from the first lens group. Hence, there is adopted an arrangement by which the lens surface is convex toward the object side so as not to cause various off-axis aberrations. Further, this arrangement is also preferable in order to suppress the occurrence of spherical aberration of the on-axis rays diverged from the first lens group and the occurrence of coma aberration of the off-axis rays.

Further, in the zoom lens, the surface closest to the object side in the second lens group is aspheric. Thereby, the zoom lens is able to correct spherical aberration and coma aberration satisfactorily. As a result, the zoom lens has an advantage in that it is easy to obtain a reliable optical performance even when a high magnification power and a wide angle of the optical system are achieved.

Furthermore, in the zoom lens, in order to correct chromatic aberration satisfactorily, the cemented lens formed of the negative meniscus lens and the positive lens in the second lens group is disposed, and the object side surface of the negative meniscus lens is convex toward the object side. In the zoom lens, by adopting such a configuration, the cemented lens easily satisfies a sine condition. As a result, it is possible to reduce the occurrence of spherical aberration and coma aberration.

Furthermore, the cemented lens of the second lens group is configured to satisfy the following conditional expression (1).

$$0.3 < R_{CL}/f2 < 1.0. \quad (1)$$

Here, $R_{CL}$ is a radius of curvature of the cemented surface of the cemented lens constituting the second lens group, and f2 is a focal length of the second lens group.

The conditional expression (1) defines a radius of curvature of the cemented surface of the cemented lens, and it becomes easy to satisfy the sine condition by satisfying this conditional expression. In the conditional expression (1), when the result value of the expression exceeds the upper limit, the radius of curvature of the cemented surface becomes too gentle. In this case, it is difficult to correct longitudinal chromatic aberration and chromatic coma aberration (difference of colors in coma aberration) on the cemented surface. Hence, this case is undesirable.

In contrast, in the conditional expression (1), when the result value of the expression exceeds the lower limit, the radius of curvature of the cemented surface becomes too strong. In this case, as the refractive power thereof increases, the occurrence of longitudinal chromatic aberration and chromatic coma aberration in the second lens group excessively increases, thereby causing deterioration in image quality.

Further, in the zoom lens according to the embodiment of the invention, two lenses (a negative lens L11 and a positive lens L12) constituting the first lens group GR1 as shown in FIG. 1 are configured to satisfy the following conditional expressions (2) and (3).

$$0.3 < (R21 - R12)/(R12 + R21) < 0.5, \text{ and} \quad (2)$$

$$0.1 < (|Sg21| + |Sg12|)/|f1| < 0.3. \quad (3)$$

Here, as shown in FIGS. 1, 2A, and 2B, R21 is a paraxial radius of curvature of an object side surface of the positive lens L12 in the first lens group GR1, R12 is a paraxial radius of curvature of an image side surface of the negative lens L11 in the first lens group GR1, f1 is a focal length of the first lens group GR1, f(Δsag) value is a value obtained by subtracting a sag amount of an aspheric shape SgASP from a sag amount of a paraxial radius of curvature SgSP, Sg21 is an f(Δsag) value at an effective diameter position ΔH on the object side surface of the positive lens L12 in the first lens group GR1, and Sg12 is an f(Δsag) value at an effective diameter position ΔH on the image side surface of the negative lens L11 in the first lens group GR1.

Furthermore, as shown in FIG. 2B, when the effective diameter position ΔH on the image side surface of the negative lens L11 in the first lens group GR1 is larger than R12, the Sg12 is an f(Δsag) value at a position radially spaced at a distance (corresponding to R12) from an optical axis.

As described above, in the zoom lens according to the embodiment of the invention, when the effective diameter position ΔH on the image side surface of the negative lens L11 in the first lens group GR1 is larger than R12, the Sg12 is approximate to an f(Δsag) value at a position radially spaced at a distance (corresponding to R12) from an optical axis.

The conditional expression (2) defines a shape factor of an air lens formed between the two lenses of the first lens group. In the conditional expression (2), when the result value of the expression becomes smaller than the lower limit, the curvatures of the surfaces of the air lens become gentle. Thereby, the refractive power thereof decreases, and thus it becomes difficult to downsize the optical system.

Further, in the conditional expression (2), when the result value of the expression exceeds the lower limit, incident angles of rays incident from the object side to the air lens in the vicinity of maximum angle of view tend to increase. Hence, it becomes difficult to correct various off-axis aberrations while achieving an increase in imaging field angle.

In contrast, in the conditional expression (2), when the result value of the expression becomes larger than the upper limit, the curvatures of the surfaces of the air lens become too strong. Hence, the occurrence of off-axis aberration increases on the wide-angle end side, and the occurrence of on-axis aberration increases on the telephoto end side. Moreover, it becomes difficult to secure an edge thickness of the positive lens L12 of the first lens group GR1 and reduce the sensitivity to eccentricity. Hence, the productivity at the time of manufacturing the zoom lens barrel deteriorates.

The conditional expression (3) defines aspheric shapes formed on the image side surface of the negative lens L11 and the object side surface of the positive lens L12 in the first lens group GR1. In the conditional expression (3), when the result value of the expression exceeds the lower limit, it means that the aspheric shapes of both surfaces of the air lens formed between the negative lens L11 and the positive lens L12 approximate to the spherical surface. In this case, since the correction effect of the aspheric lenses in the first lens group GR1 is lost, various off-axis aberrations excessively increase, and, particularly, it becomes difficult to correct astigmatism at the wide-angle end, thereby causing deterioration in optical performance.

Further, in the conditional expression (3), when the result value of the expression exceeds the upper limit, the various aberrations are corrected too much by the aspheric shapes, and thus it becomes difficult to perform the aberration correction based on the first lens group GR1. Moreover, the sensitivity to eccentricity also increases, and thus it becomes difficult to manufacture the zoom lens barrel.

Furthermore, the zoom lens according to an embodiment of the invention has a simple configuration in which the third lens group includes only a cemented lens formed to have a negative refractive power as a whole by cementing a positive lens and a negative lens in order from the object side. With such a configuration, it is possible to downsize the optical system.

In this case, the third lens group is configured to satisfy the following conditional expressions (4) and (5).

$$\nu 3p > 45, \quad (4)$$

$$10 < \nu 3p - \nu 3n < 30, \text{ and} \quad (5)$$

$$1.0 < (R3a + R3b)/(R3a - R3b) < 6.0, \quad (6)$$

Here, $\nu 3p$ is an Abbe number of the positive lens constituting the cemented lens of the third lens group, $\nu 3n$ is an Abbe number of the negative lens constituting the cemented lens of the third lens group, R3a is a radius of curvature of a lens surface closest to the object side in the third lens group, and R3b is a radius of curvature of a lens surface closest to the image side in the third lens group.

The conditional expression (4) defines an Abbe number of a material of the positive lens in the cemented lens constituting the third lens group. The conditional expression (5) defines the difference between the Abbe number of the positive lens and the Abbe number of the material of the negative lens in the cemented lens.

In the third lens group, the material of the positive lens may be selected so that the lower limit of the conditional expression (4) is exceeded or the cemented lens of the third lens group may be configured so that the upper limit of the conditional expression (5) is exceeded. In these cases, the Abbe number of the material of the negative lens excessively decreases. Hence, these cases are undesirable. Generally, in a glass material having a small Abbe number, dispersion increases together with partial dispersion. Hence, particularly in a high power zoom lens, secondary spectrum (secondary dispersion) on the telephoto side tends to increase.

Further, in the third lens group, the cemented lens may be configured so that the lower limit of the conditional expression (5) is exceeded. In this case, the difference between the Abbe numbers of the positive lens and the negative lens excessively decreases. Therefore, there is no merit in the configuration in which the third lens group includes the cemented lens. Hence, this is undesirable.

The conditional expression (6) defines a shape factor of the third lens group. In the third lens group, when the result value of the expression exceeds the upper limit of the conditional expression (6), the curvature of the lens surface may be too strong. In this case, the tilting of the image plane frequently occurs at the time of vibration absorption based on hand shake correction, thereby causing deterioration in image quality.

Further, in the third lens group, when the result value of the expression exceeds the lower limit of the conditional expression (6), the configuration of the cemented lens is inappropriate. Accordingly, it becomes difficult to correct chromatic aberration in the cemented lens in the third lens group.

In addition, in the zoom lens according to an embodiment of the invention, the image can be shifted by moving (shifting) the third lens group in a direction approximately perpendicular to the optical axis.

In practice, by moving the third lens group in the direction approximately perpendicular to the optical axis, the zoom lens is configured to function as an anti-vibration optical system in combination with a detection system which detects image blur, a driving system which shifts the lens groups, and a control system which provides a shift amount to the driving system on the basis of the output of the detection system.

In particular, since the zoom lens is configured to shift the third lens group, which has a small number of elements and has a small lens diameter, in the direction perpendicular to the optical axis, it is possible to downsize an anti-vibration unit, reduce load on the actuator, and save electric power.

Furthermore, in the zoom lens the third lens group is configured to satisfy the above-mentioned conditional expressions (4) to (6). With such a configuration, it is possible to reduce the occurrence of eccentricity aberration caused when the third lens group is shifted. As a result, it is possible to shift an image with small aberration fluctuation.

Furthermore, in the zoom lens according to an embodiment of the invention, the first lens group is configured to include two elements of a negative lens, of which at least an image side surface is aspheric and a concave surface faces toward the image side, and a positive meniscus lens, of which at least an object side surface is aspheric and a convex surface faces toward the object side, arranged in order from the object side, and satisfy the following conditional expressions (7) and (8).

$$n_{d12} > 1.9, \text{ and} \quad (7)$$

$$\nu_{d12} < 22. \quad (8)$$

Here, $n_{d12}$ is a refractive index of the positive meniscus lens constituting the first lens group at the d-line, and $\nu_{d12}$ is an Abbe number of the positive meniscus lens constituting the first lens group.

The conditional expressions (7) and (8) define a refractive index and an Abbe number of the positive meniscus lens constituting the first lens group.

In the zoom lens, when the result value of the expression exceeds the range of the conditional expression (7), it is necessary to increase the curvature of the positive meniscus lens. Thus, it becomes difficult to correct aberration of image field curvature at the wide-angle end, thereby causing deterioration in optical performance. Further, it also becomes difficult to secure the edge thickness of the lenses, thereby causing difficulty in the manufacture of the lens barrel.

Further, in the zoom lens, when the result value of the expression exceeds the range of the conditional expression (8), it becomes difficult to correct chromatic aberration that occurs in the first lens group. As a result, this causes deterioration in optical performance.

Furthermore, in the zoom lens according to an embodiment of the invention, the two lenses constituting the cemented lens of the second lens group are configured to satisfy the following conditional expression (9). With such a configuration, it is possible to correct further chromatic aberration (longitudinal chromatic aberration, chromatic coma aberration) satisfactorily.

$$40 < \nu 2p - \nu 2n < 70. \quad (9)$$

Here, $\nu 2p$ is an Abbe number of the positive lens constituting the cemented lens in the second lens group, and $\nu 2n$ is an Abbe number of the negative lens constituting the cemented lens in the second lens group.

The conditional expression (9) defines the difference between the Abbe number of the material of the positive lens and the Abbe number of the material of the negative meniscus lens in the cemented lens of the second lens group.

In the zoom lens, the result value of the expression may exceed the upper limit of the conditional expression (9) and excessively increase. In this case, chromatic dispersion increases as the Abbe number of the material of the negative lens excessively decreases, and thus the occurrence of chromatic aberration excessively increases. Hence, this case is undesirable.

Further, in the zoom lens, the result of the expression may exceed the lower limit of the conditional expression (9) and excessively decrease. In this case, the difference between the Abbe numbers of the positive lens and the negative meniscus lens constituting the cemented lens becomes excessively small. Hence, it becomes difficult to correct chromatic aberration.

Furthermore, in the zoom lens according to an embodiment of the invention, it is preferable to perform focusing by moving the first lens group with a negative focal length and fourth lens group with a positive focal length in the optical axis direction.

In particular, by using the fourth lens group as a lens group for focusing, the zoom lens is configured to easily avoid the interference with the driving system which performs driving controls of the shutter unit and the iris unit and the anti-vibration driving system which shifts the third lens group. With such a configuration, the zoom lens can be downsized.

2. Numerical Examples

Next, numerical examples will hereinafter be described with reference to the accompanying drawings and tables, in which specific numerical values are applied to the zoom lens according to the embodiment of the invention. Furthermore, in the numerical examples, the reference signs are defined as follows.

"FNo" is an F number, "f" is a focal length of the whole lens system, "ω" is a half angle of view of an opposite angle, "si" is an i-th surface counted from the object side, "ri" is a radius of curvature of the surface si, "di" is an on-axis surface spacing between the i-th surface and an (i+1)th surface from the object surface, "ni" is a refractive index of an i-th lens at the d-line (a wavelength of 587.6 nm), and "vi" is an Abbe number of the i-th lens at the d-line (a wavelength of 587.6 nm).

Regarding the surface number, "ASP" represents that the corresponding surface is aspheric, "STO" represents that the corresponding surface is formed as an aperture diaphragm, and "INFINITY" represents that the corresponding surface is planar.

Further, in the zoom lens according to an embodiment of the invention, some lens surfaces are formed in aspheric shapes, and the aspheric shapes are defined by the following Numerical Expression 1.

$$x = cy^2/(1+(1-(1+k)c^2y^2)^{1/2}) + Ay^4 + By^6 + \quad (1)$$

Here, x is a distance from the lens surface vertex in the optical axis direction, y is a height of the direction perpendicular to the optical axis, c is paraxial curvature at the lens vertex, k is a conic constant, and A, B, and C, . . . are aspheric coefficients.

2-1. First Numerical Example

Figure 3:
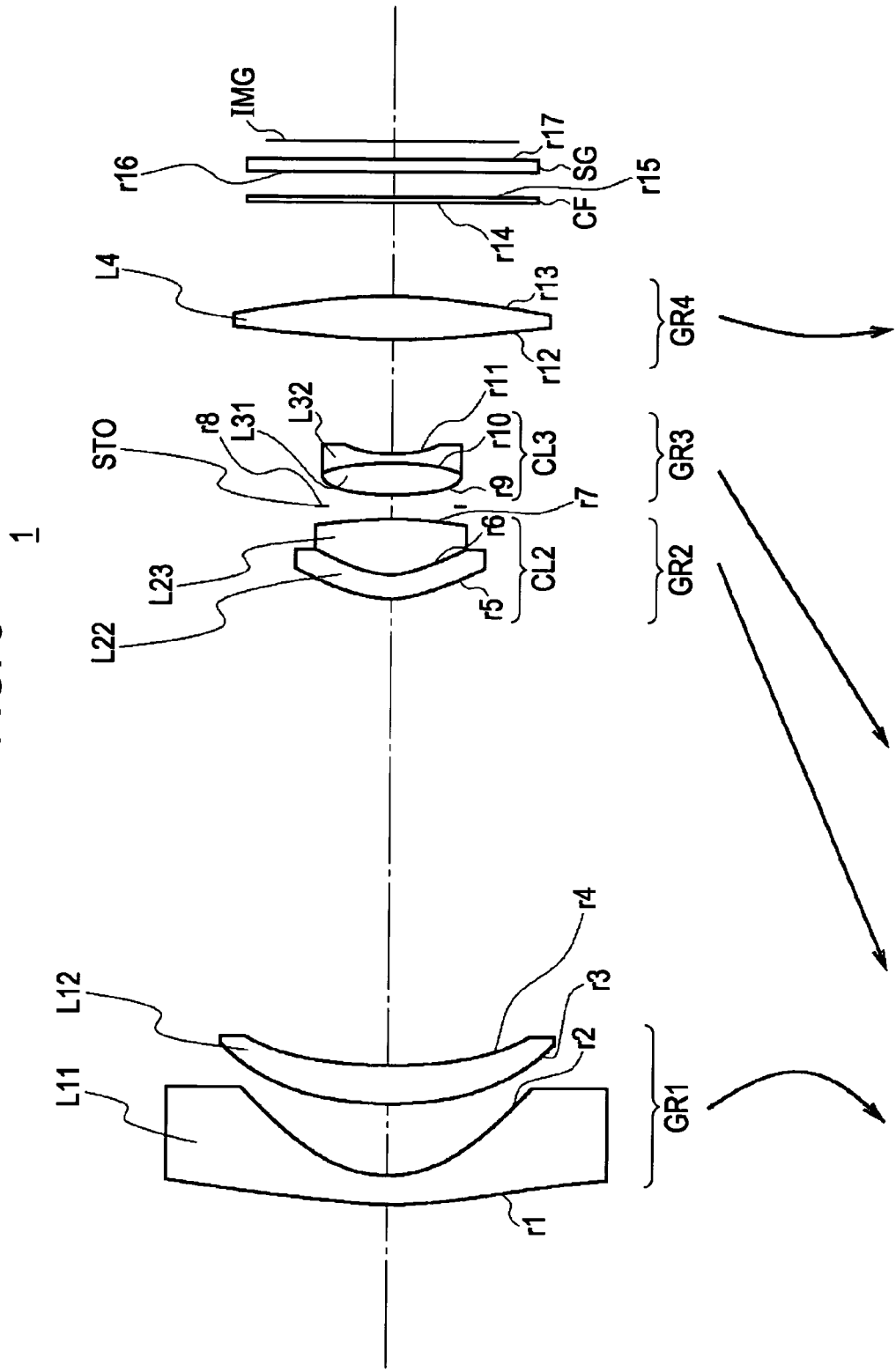
FIG. 3 is schematic sectional view illustrating a configuration of a zoom lens according to a first numerical example.

In FIG. 3, the reference numeral 1 represents the whole zoom lens in a first numerical example, and the zoom lens includes, in order from the object side: a first lens group GR1 with a negative focal length; a second lens group GR2 with a positive focal length; a third lens group GR3 with a negative focal length; and a fourth lens group GR4 with a positive focal length.

In the zoom lens 1, during zooming from a wide-angle end to a telephoto end, the first lens group GR1 moves along a locus having a convex shape toward an image side while decreasing an air space between the first lens group GR1 and the second lens group GR2, and the second lens group GR2 and the third lens group GR3 move toward the object side while increasing an air space therebetween. In addition, a surface closest to the object side in the second lens group GR2 is convex toward the object side and is aspheric, and the second lens group GR2 includes a cemented lens CL2 formed of a negative meniscus lens L22 convex toward the object side and a positive lens L23.

Here, the surface r5 closest to the object side in the second lens group GR2 strongly refracts off-axis principal rays exiting from the first lens group GR1. Hence, there is adopted an arrangement by which the lens surface is convex toward the object side so as not to cause various off-axis aberrations. Further, this arrangement is also preferable in order to suppress the occurrence of spherical aberration of the on-axis rays diverged from the first lens group GR1 and the occurrence of coma aberration of the off-axis rays.

Further, in the zoom lens 1, the surface r5 closest to the object side in the second lens group GR2 is aspheric. Thereby, the zoom lens 1 is able to correct spherical aberration and coma aberration satisfactorily. As a result, the zoom lens 1 has an advantage in that it is easy to obtain a reliable optical performance even when a high magnification power and a wide angle of the optical system are achieved.

Furthermore, in the zoom lens 1, in order to correct chromatic aberration satisfactorily, the cemented lens CL2 formed of the negative meniscus lens L22 and the positive lens L23 in the second lens group GR2 is disposed, and the object side surface r5 of the negative meniscus lens L22 is convex toward the object side. In the zoom lens 1, by adopting such a configuration, the cemented lens CL2 easily satisfies a sine condition. As a result, it is possible to reduce the occurrence of spherical aberration and coma aberration.

Furthermore, the zoom lens 1 has a simple configuration in which the third lens group GR3 includes only a cemented lens CL3 formed to have a negative refractive power as a whole by cementing a positive lens L31 and a negative lens L32 in order from the object side. With such a configuration, it is possible to downsize the optical system.

In addition, in the zoom lens 1, the image can be shifted by moving (shifting) the third lens group GR3 in a direction approximately perpendicular to the optical axis.

In practice, by moving the third lens group GR3 in the direction approximately perpendicular to the optical axis, the zoom lens 1 is configured to function as an anti-vibration optical system in combination with a detection system which detects image blur, a driving system which shifts the lens groups, and a control system which provides a shift amount to the driving system on the basis of the output of the detection system.

In particular, since the zoom lens 1 is configured to shift the third lens group GR3, which has a small number of elements and has a small lens diameter, in the direction perpendicular to the optical axis, it is possible to downsize an anti-vibration unit, reduce load on the actuator, and save electric power.

Furthermore, in the zoom lens, the first lens group GR1 is configured to include two elements of a negative lens L11, of which at least an image side surface r2 is aspheric and a concave surface faces toward the image side, and a positive meniscus lens L12, of which at least an object side surface r3 is aspheric and a convex surface faces toward the object side, arranged in order from the object side.

Furthermore, in zoom lens 1, it is preferable to perform focusing by moving the first lens group GR1 with a negative focal length and fourth lens group GR4 with a positive focal length in the optical axis direction.

In particular, by using the fourth lens group GR4 as a lens group for focusing, the zoom lens 1 is configured to easily avoid the interference with the driving system which performs driving controls of the shutter unit and the iris unit and the anti-vibration driving system which shifts the third lens group GR3. With such a configuration, the zoom lens 1 can be downsized.

In addition, in the zoom lens 1, an aperture diaphragm STO is disposed on the object side of the third lens group GR3, and a seal glass SG for protecting an IR cut filter CF and an image forming surface IMG is disposed between the positive meniscus lens L4 of the fourth lens group GR4 and the image forming surface IMG.

As described above, in the zoom lens 1, by adopting the above-mentioned lens element configuration, it is possible to achieve a high zoom ratio and a wide angle, and it is also possible to correct various aberrations of the lens system satisfactorily.

Table 1 shows lens data at the time of applying specific numerical values to the zoom lens 1 of the first numerical example, together with an F number FNo, a focal length f of the total length of the whole lens system, and an angle of view ω.

TABLE 1

TABLE 1 LENS DATA OF FIRST NUMERICAL EXAMPLE
f = 4.43~25.82 FNo = 2.84~8.52 ω = 41.37~8.59

| si | ri | di | ni | vi |
|---|---|---|---|---|
| 1 (ASP) | 12.239 | 0.800 | 1.76802 | 49.240 |
| 2 (ASP) | 3.532 | 2.306 | | |
| 3 (ASP) | 8.802 | 1.222 | 2.00178 | 19.300 |
| 4 (ASP) | 12.321 | (d4) | | |
| 5 (ASP) | 4.600 | 0.800 | 1.92286 | 20.880 |
| 6 | 3.844 | 1.750 | 1.49700 | 81.610 |
| 7 (ASP) | −10.870 | 0.300 | | |
| 8 (STO) | INFINITY | (d8) | | |
| 9 | 6.042 | 0.900 | 1.65160 | 58.400 |
| 10 | −12.043 | 0.300 | 1.73077 | 40.500 |
| 11 (ASP) | 4.000 | (d11) | | |
| 12 (ASP) | −275.490 | 1.250 | 1.68893 | 31.160 |
| 13 (ASP) | −15.000 | (d13) | | |
| 14 | INFINITY | 0.300 | 1.51680 | 64.200 |
| 15 | INFINITY | 0.720 | | |
| 16 | INFINITY | 0.500 | 1.55671 | 58.562 |
| 17 | INFINITY | 0.500 | | |
| IMG | INFINITY | | | |

In the zoom lens 1, the object side surface r1 of the negative lens L11, the image side surface r2 of the negative lens L11, the object side surface r3 of the positive meniscus lens L12, and the image side surface r4 of the positive meniscus lens L12 in the first lens group GR1, and the object side surface r5 of the negative meniscus lens L22 in the second lens group GR2 are aspheric.

Further, in the zoom lens 1, the image side surface r7 of the positive lens L23 in the second lens group GR2, the image side surface r11 of the negative lens L32 in the third lens group GR3, and the object side surface r12 and the image side surface r13 of the positive meniscus lens L4 in the fourth lens group GR4 are aspheric.

Table 2 shows on-axis surface spacings (variable on-axis surface spacings) which are variable when, in the zoom lens 1, the first lens group GR1 moves along a locus having a convex shape toward an image side while decreasing an air space between the first and second lens groups GR1 and GR2, and the second and third lens groups GR2 and GR3 move toward the object side while increasing an air space therebetween.

That is, in the zoom lens 1, during zooming from the wide-angle end to the telephoto end, a space d4 between the first lens group GR1 and the second lens group GR2, a space d8 from the aperture diaphragm STO to the third lens group GR3, a space d11 between the third lens group GR3 and the fourth lens group GR4, and a space d13 between the fourth lens group GR4 and the IR cut filter CF are varied.

Table 2 shows, in order from the left side, numerical values of the respective surfaces at the wide-angle end (f=4.43), the intermediate focal length position (f=10.69), and the telephoto end (f=25.82) in the zoom lens 1 of the first numerical example.

TABLE 2

TABLE 2 VARIABLE ON-AXIS SURFACE SPACINGS OF FIRST NUMERICAL EXAMPLE

| f | 4.43 | 10.69 | 25.82 |
|---|---|---|---|
| d4 | 15.100 | 4.044 | 0.500 |
| d8 | 0.500 | 1.552 | 3.300 |
| d11 | 3.800 | 5.939 | 20.322 |
| d13 | 3.011 | 5.793 | 4.229 |

Subsequently, Table 3 shows 4th-order, 6th-order, 8th-order, and 10th-order aspheric coefficients "A", "B", "C", and "D" and conic constants "K" of the aspheric surfaces in the zoom lens 1 of the first numerical example. Furthermore, in Table 3, the reference sign "E-01" represents an exponential expression having a base of 10, that is, "$10^{-1}$". For example, "0.12345E-05" represents "$0.12345 \times 10^{-5}$".

TABLE 3

TABLE 3 ASPHERIC COEFFICIENTS IN FIRST NUMERICAL EXAMPLE

| si | K | A | B | C | D |
|---|---|---|---|---|---|
| 1 | 0.00000E+00 | −2.30735E−03 | 8.50733E−05 | −1.65235E−06 | 1.27568E−08 |
| 2 | −5.56804E−01 | −3.39930E−03 | 7.35051E−05 | 1.27974E−06 | −1.34738E−07 |
| 3 | 8.43583E−01 | −1.01971E−03 | 9.10202E−05 | −3.15482E−06 | 4.51587E−08 |
| 4 | 0.00000E+00 | −9.39868E−04 | 1.02042E−04 | −3.84282E−06 | 6.76272E−08 |
| 5 | 0.00000E+00 | −3.24939E−04 | 1.42606E−06 | 3.94695E−07 | 2.70291E−07 |
| 7 | 0.00000E+00 | 1.30592E−03 | −9.47763E−06 | 1.67049E−05 | 7.20746E−08 |
| 11 | 0.00000E+00 | 2.78192E−04 | 2.21282E−05 | 4.26871E−05 | −8.96017E−06 |
| 12 | 0.00000E+00 | 1.34054E−03 | −3.50484E−05 | 0.00000E+00 | 0.00000E+00 |
| 13 | 0.00000E+00 | 1.53529E−03 | −4.01066E−05 | −5.14937E−08 | 0.00000E+00 |

Next, Table 4 shows corresponding values of the conditional expressions (1) to (9) in the zoom lens 1 of the first numerical example.

TABLE 4

| TABLE 4 CONDITIONAL EXPRESSIONS IN FIRST NUMERICAL EXAMPLE | | |
|---|---|---|
| (1) | $R_{CL}/f2$ | 0.52 |
| (2) | (R21 − R12)/(R12 + R21) | 0.43 |
| (3) | (|Sg21| + |Sg12|)/|f1| | 0.12 |
| (4) | ν3p | 58.40 |
| (5) | ν3p − ν3n | 17.90 |
| (6) | (R3a + R3b)/(R3a − R3b) | 4.92 |
| (7) | nd12 | 2.00 |
| (8) | νd12 | 19.30 |
| (9) | ν2p − ν2n | 60.73 |

Figure 4:
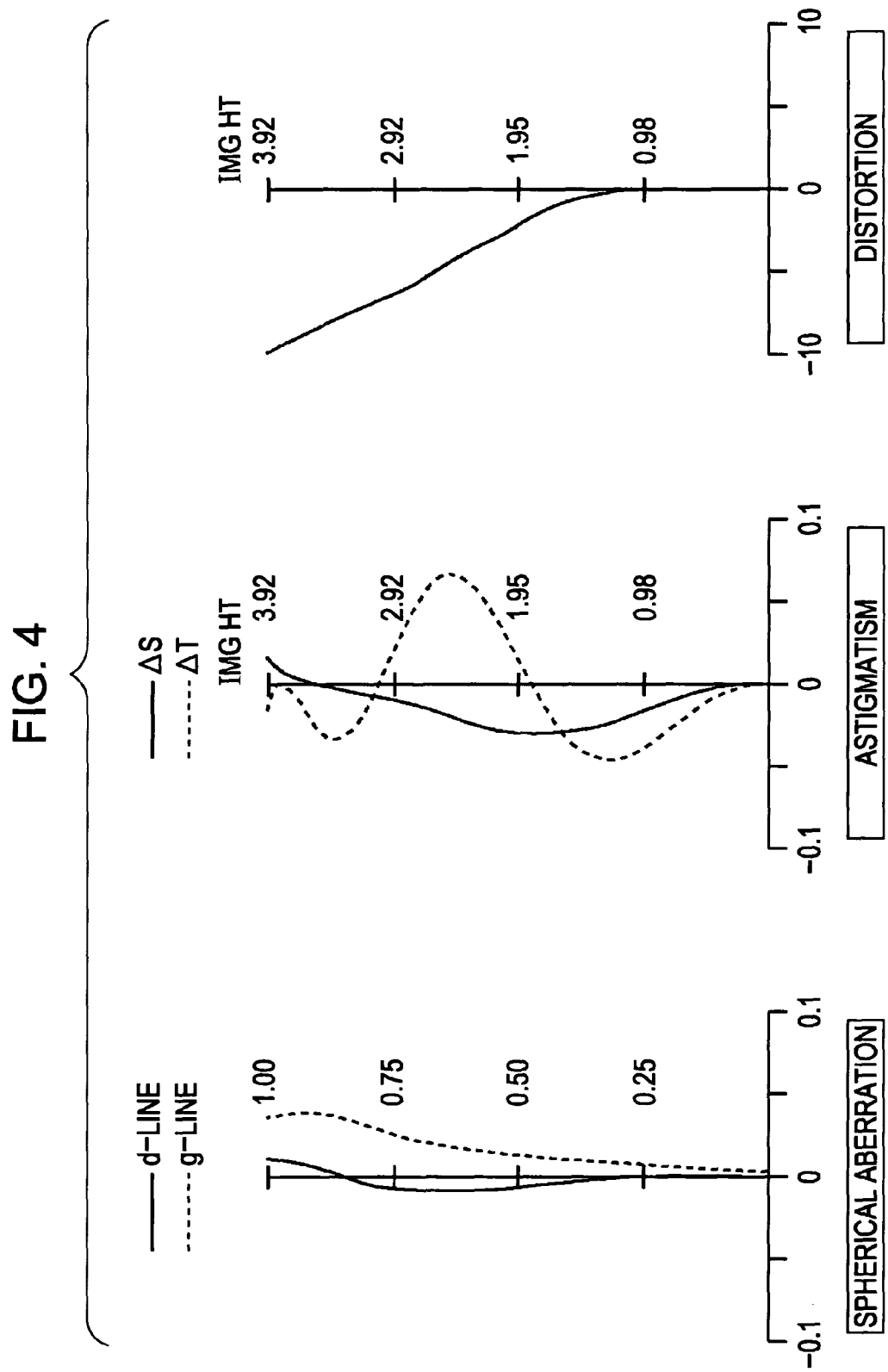
FIG. 4 is a characteristic curve diagram illustrating various aberrations at the wide-angle end in the first numerical example.
Figure 5:
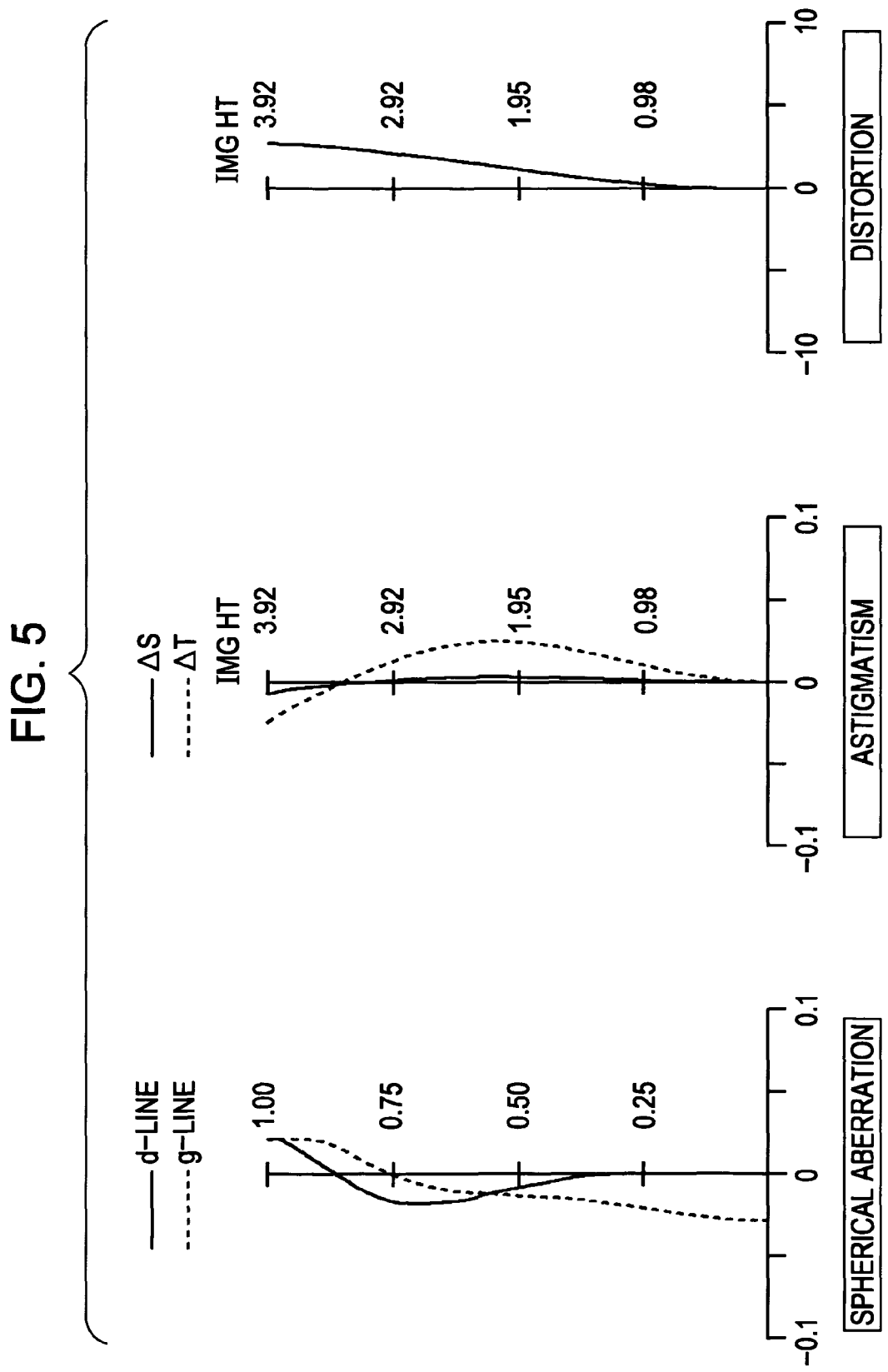
FIG. 5 is a characteristic curve diagram illustrating the various aberrations at the intermediate focal length position in the first numerical example.
Figure 6:
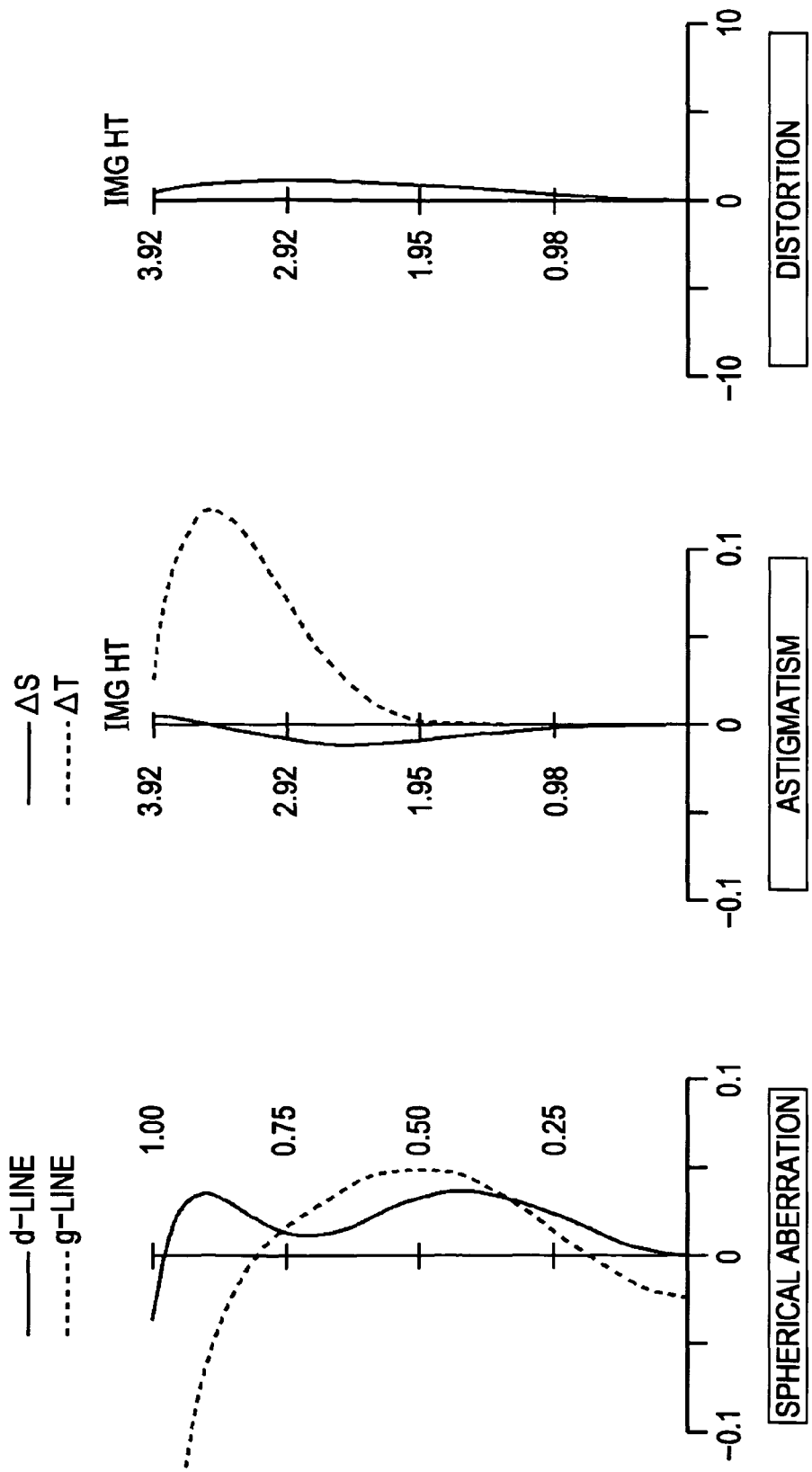
FIG. 6 is a characteristic curve diagram illustrating the various aberrations at the telephoto end in the first numerical example.

Next, FIGS. 4 to 6 show various aberrations in the zoom lens 1 of the first numerical example. Here, FIG. 4 shows various aberrations (spherical aberration, astigmatism, and distortion) at the wide-angle end. FIG. 5 shows various aberrations (spherical aberration, astigmatism, and distortion) at the intermediate focal length position, and FIG. 6 shows various aberrations (spherical aberration, astigmatism, and distortion) at the telephoto end.

Further, in each spherical aberration diagram, the solid line represents a value at the d-line, and the dashed line represents a value at the g-line. In each astigmatism diagram, the solid line represents a value on the sagittal image plane, and the dashed line shows a value on the meridional image plane.

From aberration diagrams (spherical aberration, astigmatism, and distortion) shown in FIGS. 4 to 6 and Tables 1 to 4 mentioned above, it can be seen that in the zoom lens 1 of the first numerical example, an imaging field angle (ω) at the wide-angle end is about 40 degrees or more, a zoom ratio (f25.82/f4.43) is about six times, the thicknesses of the lens groups are thin, the size thereof is decreased as a whole, and various aberrations are satisfactorily corrected, thereby exhibiting an excellent optical performance.

2-2. Second Numerical Example

Figure 7:
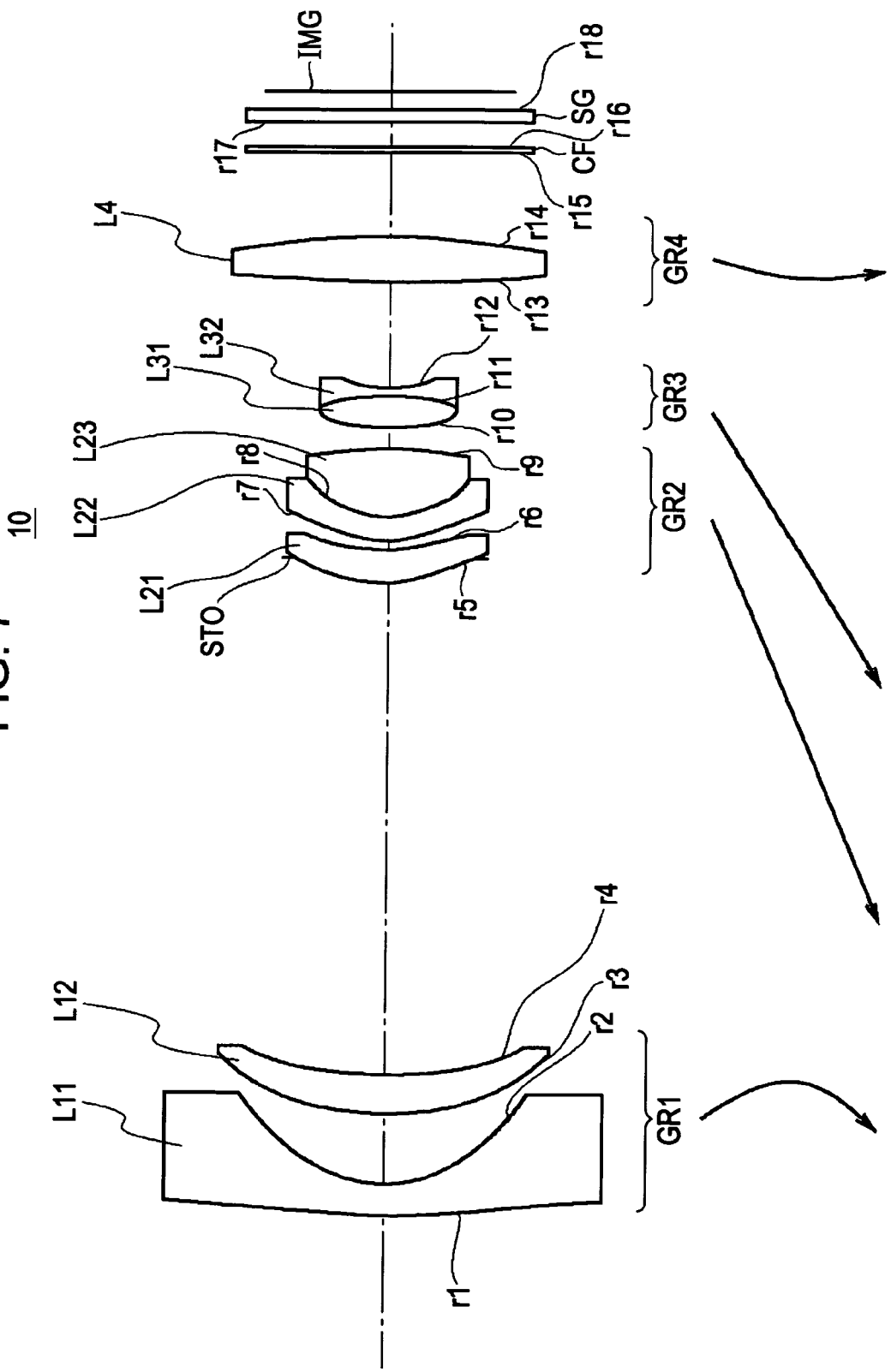
FIG. 7 is a schematic sectional view illustrating a configuration of a zoom lens according to a second numerical example.

In FIG. 7, the reference numeral 10 represents the whole zoom lens in a second numerical example, and the zoom lens includes, in order from the object side: a first lens group GR1 with a negative focal length; a second lens group GR2 with a positive focal length; a third lens group GR3 with a negative focal length; and a fourth lens group GR4 with a positive focal length.

Specifically, in the zoom lens 10, during zooming from a wide-angle end to a telephoto end, the first lens group GR1 moves along a locus having a convex shape toward an image side while decreasing an air space between the first lens group GR1 and the second lens group GR2, and the second lens group GR2 and the third lens group GR3 move toward the object side while increasing an air space therebetween. In addition, a surface closest to the object side in the second lens group GR2 is convex toward the object side and is aspheric, and the second lens group GR2 includes a cemented lens CL2 formed of a negative meniscus lens L22 convex toward the object side and a positive lens L23.

Here, the surface r5 closest to the object side in the second lens group GR2 strongly refracts off-axis principal rays exiting from the first lens group GR1. Hence, there is adopted an arrangement by which the lens surface is convex toward the object side so as not to cause various off-axis aberrations. Further, this arrangement is also preferable in order to suppress the occurrence of spherical aberration of the on-axis rays diverged from the first lens group GR1 and the occurrence of coma aberration of the off-axis rays.

Further, in the zoom lens 10, the positive lens L21, which is disposed closest to the object side of the second lens group GR2, and the aperture diaphragm STO are integrally formed.

Further, in the zoom lens 10, the surface r5 closest to the object side in the second lens group GR2 is aspheric. Thereby, the zoom lens 10 is able to correct spherical aberration and coma aberration satisfactorily. As a result, the zoom lens 10 has an advantage in that it is easy to obtain a reliable optical performance even when a high magnification power and a wide angle of the optical system are achieved.

Furthermore, in the zoom lens 10, in order to correct chromatic aberration satisfactorily, the cemented lens CL2 formed of the negative meniscus lens L22 and the positive lens L23 in the second lens group GR2 is disposed, and the object side surface r7 of the negative meniscus lens L22 is convex toward the object side. In the zoom lens 10, by adopting such a configuration, the cemented lens CL2 easily satisfies a sine condition. As a result, it is possible to reduce the occurrence of spherical aberration and coma aberration.

Furthermore, the zoom lens 10 has a simple configuration in which the third lens group GR3 includes only a cemented lens CL3 formed to have a negative refractive power as a whole by cementing a positive lens L31 and a negative lens L32 in order from the object side. With such a configuration, it is possible to downsize the optical system.

In addition, in the zoom lens 10, the image can be shifted by moving (shifting) the third lens group GR3 in a direction approximately perpendicular to the optical axis.

In practice, by moving the third lens group GR3 in the direction approximately perpendicular to the optical axis, the zoom lens 10 is configured to function as an anti-vibration optical system in combination with a detection system which detects image blur, a driving system which shifts the lens groups, and a control system which provides a shift amount to the driving system on the basis of the output of the detection system.

In particular, since the zoom lens 10 is configured to shift the third lens group GR3, which has a small number of elements and has a small lens diameter, in the direction perpendicular to the optical axis, it is possible to downsize an anti-vibration unit, reduce load on the actuator, and save electric power.

Furthermore, in the zoom lens 10, the first lens group GR1 is configured to include two elements of a negative lens L11, of which at least an image side surface is aspheric and a concave surface faces toward the image side, and a positive meniscus lens L12, of which at least an object side surface is aspheric and a convex surface faces toward the object side, arranged in order from the object side.

Furthermore, in zoom lens 10, it is preferable to perform focusing by moving the first lens group GR1 with a negative focal length and fourth lens group GR4 with a positive focal length in the optical axis direction.

In particular, by using the fourth lens group GR4 as a lens group for focusing, the zoom lens 10 is configured to easily avoid the interference with the driving system which performs driving controls of the shutter unit and the iris unit and the anti-vibration driving system which shifts the third lens group GR3. With such a configuration, the zoom lens 10 can be downsized.

In addition, in the zoom lens 10, a seal glass SG for protecting an IR cut filter CF and an image forming surface IMG is disposed between the positive meniscus lens L4 of the fourth lens group GR4 and the image forming surface IMG.

As described above, in the zoom lens 10, by adopting the above-mentioned lens element configuration, it is possible to achieve a high zoom ratio and a wide angle, and it is also possible to correct various aberrations of the lens system satisfactorily.

Table 5 shows lens data at the time of applying specific numerical values to the zoom lens 10 of the second numerical example, together with an F number FNo, a focal length f of the total length of the whole lens system, and an angle of view ω.

TABLE 5

TABLE 5 LENS DATA OF SECOND NUMERICAL EXAMPLE
f = 4.43~25.82 FNo = 2.58~6.98 ω = 41.34~8.59

| si | ri | di | ni | vi |
|---|---|---|---|---|
| 1 (ASP) | 15.994 | 1.000 | 1.76802 | 49.240 |
| 2 (ASP) | 3.807 | 2.500 | | |
| 3 (ASP) | 9.707 | 1.300 | 1.92286 | 20.880 |
| 4 (ASP) | 14.950 | (d4) | | |
| 5 (ASP) (STO) | 6.346 | 1.165 | 1.82114 | 24.060 |
| 6 (ASP) | 9.371 | 0.150 | | |
| 7 | 5.587 | 0.780 | 1.84666 | 23.780 |
| 8 | 3.600 | 2.305 | 1.49700 | 81.610 |
| 9 | −10.110 | (d9) | | |
| 10 (ASP) | 8.998 | 0.561 | 1.58913 | 61.250 |
| 11 | −12.850 | 0.599 | 1.74950 | 35.040 |
| 12 | 4.852 | (d12) | | |
| 13 (ASP) | −246.253 | 1.550 | 1.82114 | 24.060 |
| 14 (ASP) | −15.162 | (d14) | | |
| 15 | INFINITY | 0.300 | 1.51680 | 64.200 |
| 16 | INFINITY | 0.720 | | |
| 17 | INFINITY | 0.500 | 1.55671 | 58.562 |
| 18 | INFINITY | 0.500 | | |
| IMG | INFINITY | | | |

In the zoom lens 10, the object side surface r1 of the negative lens L11, the image side surface r2 of the negative lens L11, the object side surface r3 of the positive meniscus lens L12, and the image side surface r4 of the positive meniscus lens L12 in the first lens group GR1, and the object side surface r5 of the positive lens L21 and the image side surface r6 of the positive lens L21 in the second lens group GR2 are aspheric.

Further, in the zoom lens 10, the object side surface r10 of the positive lens L31 in the third lens group GR3, and the object side surface r13 and image side surface r14 of the positive meniscus lens L4 in the fourth lens group GR4 are aspheric.

Table 6 shows on-axis surface spacings (variable on-axis surface spacings) which are variable when, in the zoom lens 10, the first lens group GR1 moves along a locus having a convex shape toward an image side while decreasing an air space between the first and second lens groups GR1 and GR2, and the second and third lens groups GR2 and GR3 move toward the object side while increasing an air space therebetween.

That is, in the zoom lens 10, during zooming from the wide-angle end to the telephoto end, a space d4 between the first lens group GR1 and the second lens group GR2, a space d9 between the second lens group GR2 and the third lens group GR3, a space d12 between the third lens group GR3 and the fourth lens group GR4, and a space d14 between the fourth lens group GR4 and the IR cut filter CF are varied.

Table 6 shows, in order from the left side, numerical values of the respective surfaces at the wide-angle end (f=4.43), the intermediate focal length position(f=10.69), and the telephoto end (f=25.82) in the zoom lens 10 of the second numerical example.

TABLE 6

TABLE 6 VARIABLE ON-AXIS SURFACE SPACINGS OF SECOND NUMERICAL EXAMPLE

| f | 4.43 | 10.70 | 25.82 |
|---|---|---|---|
| d4 | 17.000 | 4.984 | 0.411 |
| d9 | 0.700 | 1.589 | 3.411 |
| d12 | 3.800 | 7.245 | 19.576 |
| d14 | 2.715 | 4.754 | 4.600 |

Subsequently, Table 7 shows 4th-order, 6th-order, 8th-order, and 10th-order aspheric coefficients "A", "B", "C", and "D" and conic constants "K" of the aspheric surfaces in the zoom lens 10 of the second numerical example. Furthermore, in Table 7, the reference sign "E-01" represents an exponential expression having a base of 10, that is, "$10^{-1}$". For example, "0.12345E-05" represents "$0.12345 \times 10^5$".

TABLE 7

TABLE 7 ASPHERIC COEFFICIENTS IN SECOND NUMERICAL EXAMPLE

| si | K | A | B | C | D |
|---|---|---|---|---|---|
| 1 | 0.00000E+00 | −1.25589E−03 | 3.61903E−05 | −5.81340E−07 | 3.61240E−09 |
| 2 | −5.74950E−01 | −1.83831E−03 | −8.23173E−06 | 2.62835E−06 | −9.48249E−08 |
| 3 | 2.50169E−01 | −4.11688E−04 | −3.91304E−06 | 1.28939E−06 | −1.82199E−08 |
| 4 | 0.00000E+00 | −4.37627E−04 | 1.38552E−06 | 1.01524E−06 | −1.05279E−08 |
| 5 | 0.00000E+00 | 8.09997E−04 | 2.11325E−05 | 1.21590E−06 | −3.57685E−08 |
| 6 | 0.00000E+00 | 1.60122E−03 | 3.98301E−05 | 2.17439E−06 | −9.11073E−08 |
| 10 | 0.00000E+00 | −4.91150E−04 | −2.90842E−05 | 2.68933E−06 | −4.32686E−07 |
| 13 | 0.00000E+00 | 7.17511E−04 | −2.30511E−05 | 5.17896E−07 | −1.25803E−24 |
| 14 | 0.00000E+00 | 8.66618E−04 | −2.70350E−05 | 5.66239E−07 | −4.28697E−26 |

Next, Table 8 shows corresponding values of the conditional expressions (1) to (9) in the zoom lens 10 of the second numerical example.

TABLE 8

TABLE 8 CONDITIONAL EXPRESSIONS IN SECOND NUMERICAL EXAMPLE

| (1) | $R_{CL}/f2$ | 0.50 |
|---|---|---|
| (2) | (R21 − R12)/(R12 + R21) | 0.44 |
| (3) | (|Sg21| + |Sg12|)/|f1| | 0.19 |
| (4) | v3p | 61.25 |
| (5) | v3p − v3n | 26.21 |
| (6) | (R3a + R3b)/(R3a − R3b) | 3.34 |
| (7) | nd12 | 1.92 |
| (8) | vd12 | 20.88 |
| (9) | v2p − v2n | 57.83 |

Figure 8:
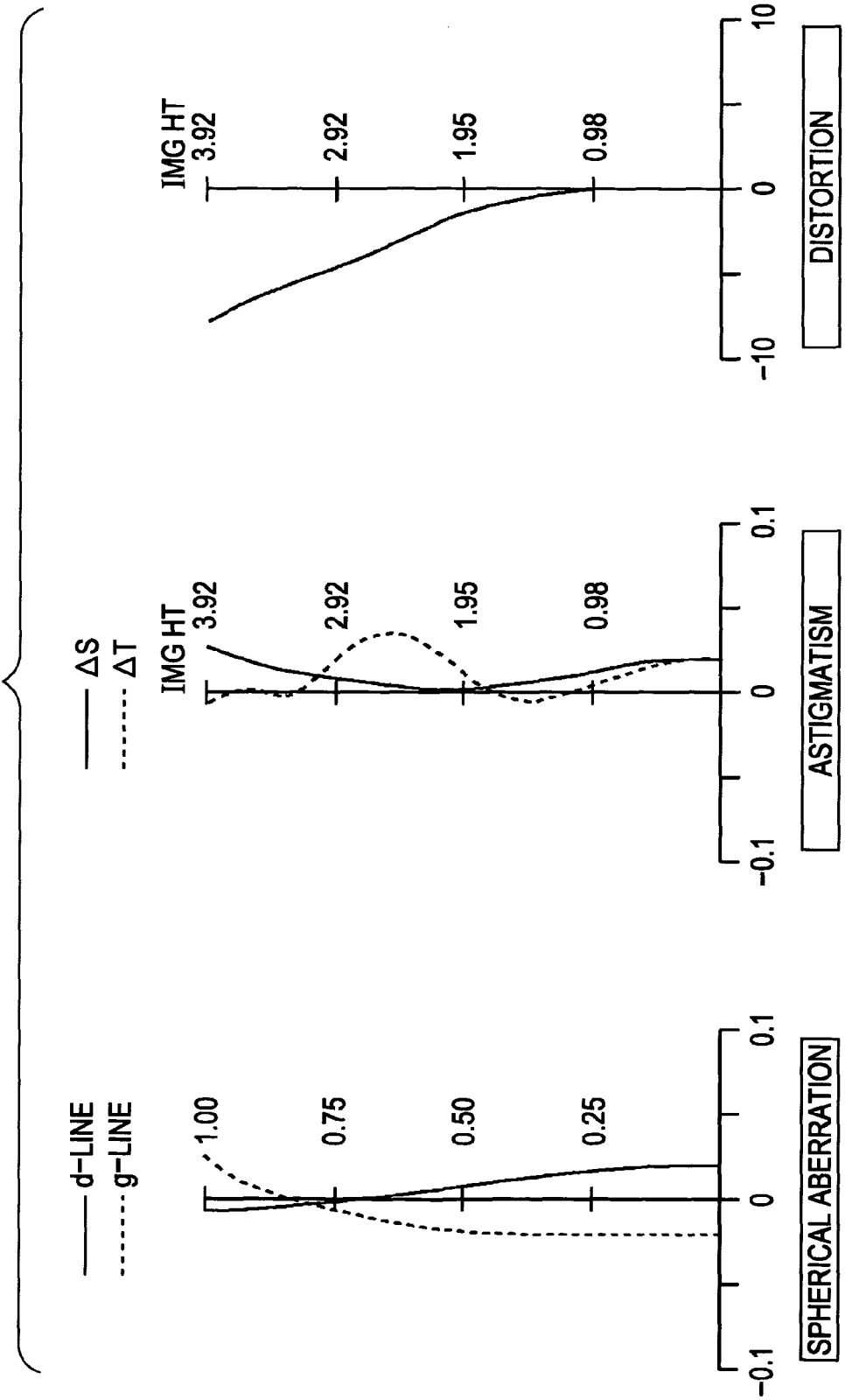
FIG. 8 is a characteristic curve diagram illustrating the various aberrations at the wide-angle end in the second numerical example.
Figure 9:
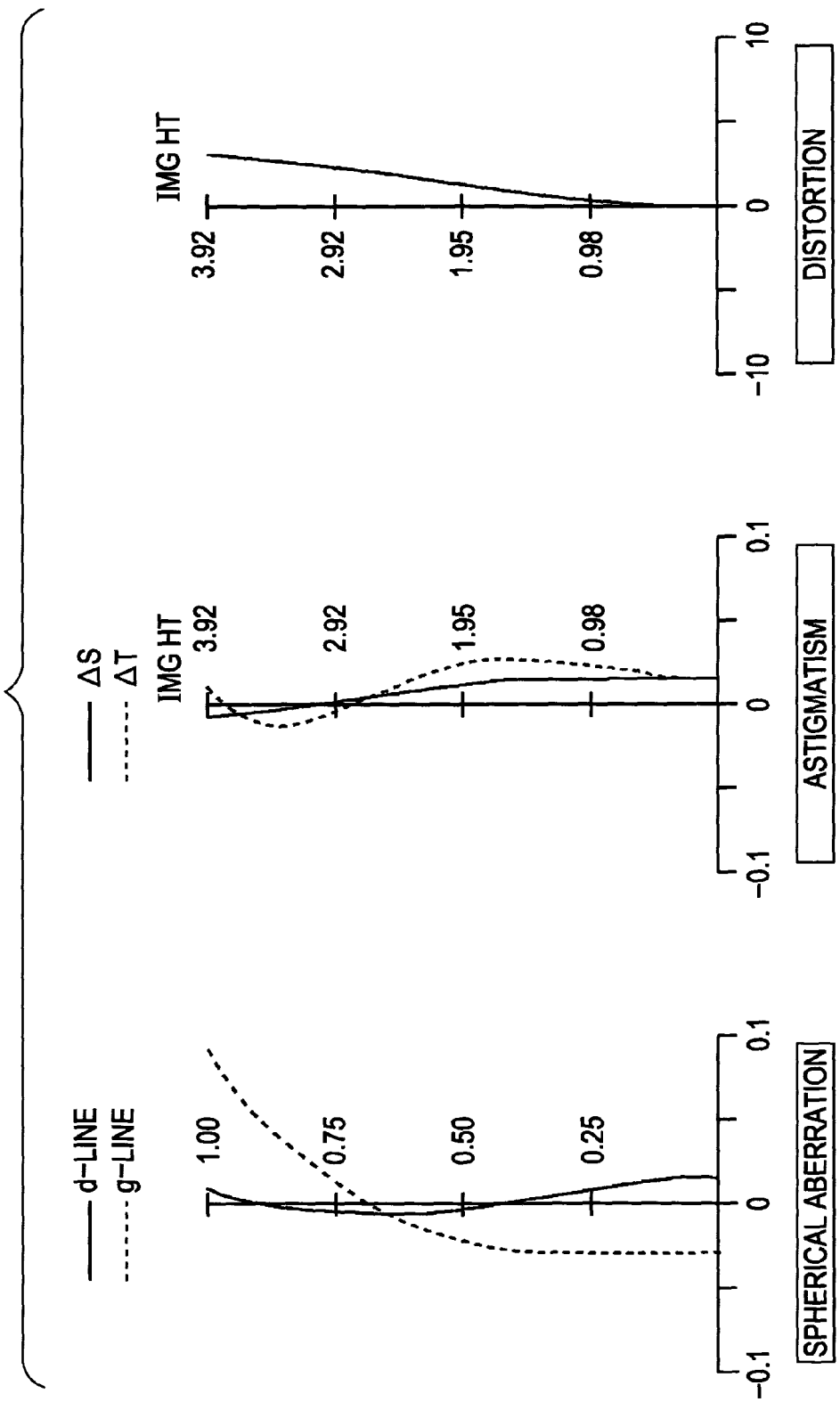
FIG. 9 is a characteristic curve diagram illustrating the various aberrations at the intermediate focal length position in the second numerical example.
Figure 10:
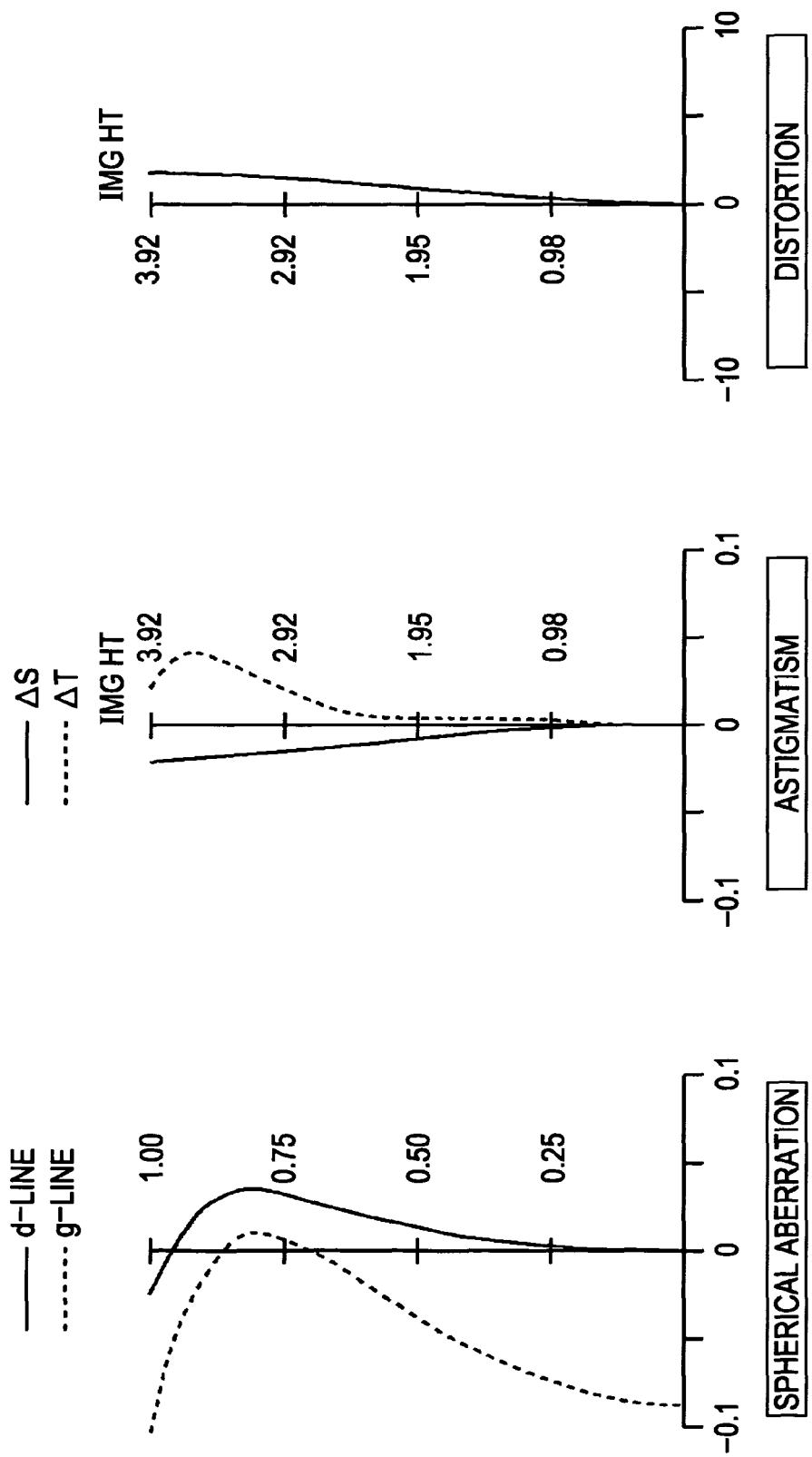
FIG. 10 is a characteristic curve diagram illustrating the various aberrations at the telephoto end in the second numerical example.
Figure 11:
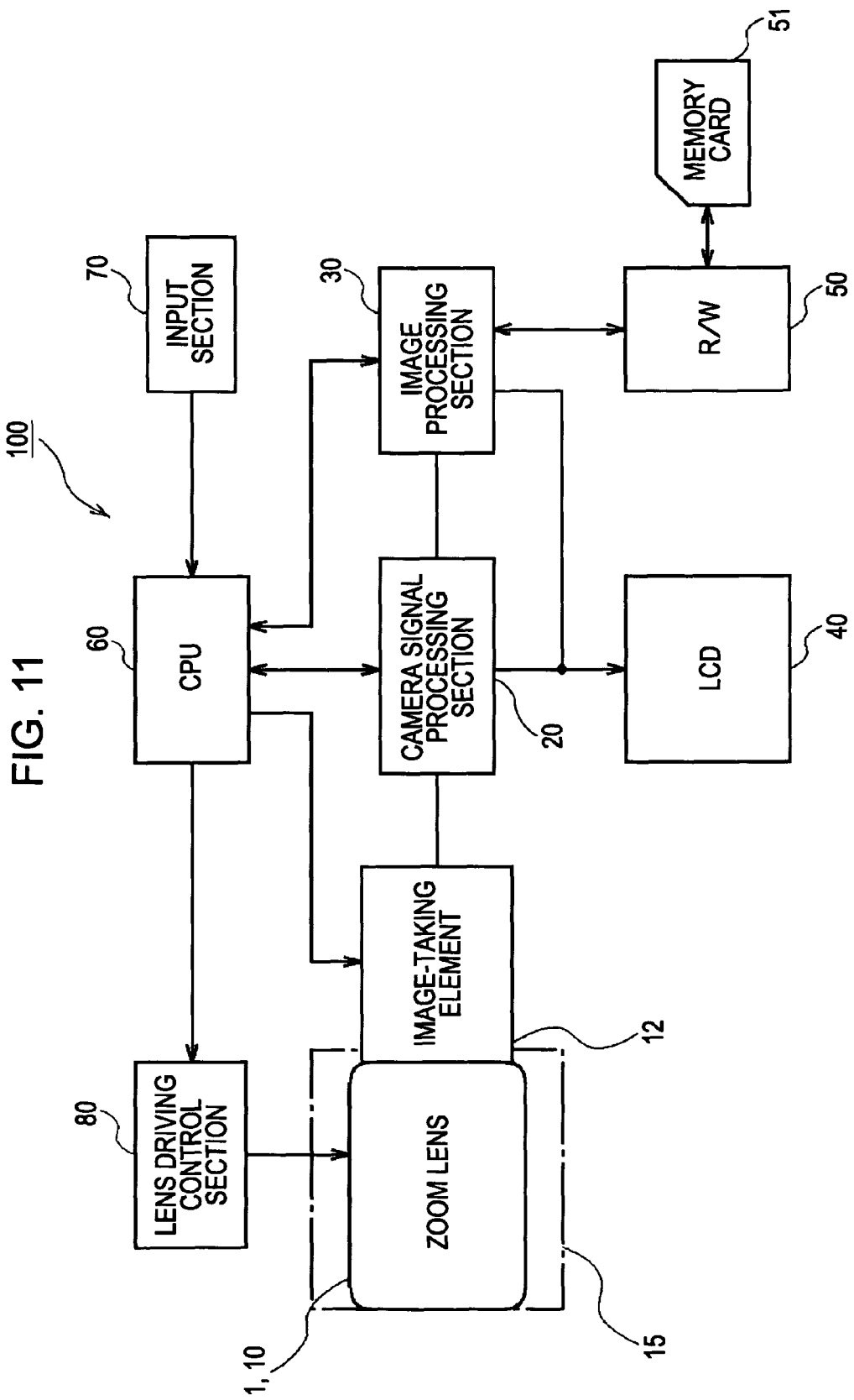
FIG. 11 is a schematic block diagram illustrating a configuration of a digital still camera circuit equipped with an image capture apparatus.

Next, FIGS. 8 to 10 show various aberrations in the zoom lens 10 of the second numerical example. Here, FIG. 8 shows various aberrations (spherical aberration, astigmatism, and distortion) at the wide-angle end. FIG. 9 shows various aberrations (spherical aberration, astigmatism, and distortion) at the intermediate focal length position, and FIG. 10 shows various aberrations (spherical aberration, astigmatism, and distortion) at the telephoto end.

Further, in each spherical aberration diagram, the solid line represents a value at the d-line, and the dashed line represents a value at the g-line. In each astigmatism diagram, the solid line represents a value on the sagittal image plane, and the dashed line shows a value on the meridional image plane.

From aberration diagrams (spherical aberration, astigmatism, and distortion) shown in FIGS. 8 to 10 and Tables 5 to 8 mentioned above, it can be seen that in the zoom lens 10 of the second numerical example, an imaging field angle ($\omega$) at the wide-angle end is about 40 degrees or more, a zoom ratio (f25.82/f4.43) is about six times, the thicknesses of the lens groups are thin, the size thereof is decreased as a whole, and various aberrations are satisfactorily corrected, thereby exhibiting an excellent optical performance.

3. Image Capture Apparatus and Digital Still Camera

3-1. Configuration of Image Capture Apparatus

Next, an image capture apparatus according to the embodiment of the invention will be described. The image capture apparatus is provided with the zoom lens according to the embodiment of the invention and an image pickup device including, for example, a CCD (Charge Coupled Device) sensor, a CMOS (Complementary Metal Oxide Semiconductor) sensor, or the like for converting an optical image, which is formed by the zoom lens, into an electric signal.

The zoom lens includes, in order from the object side: a first lens group with a negative focal length; a second lens group with a positive focal length; a third lens group with a negative focal length; and a fourth lens group with a positive focal length.

Specifically, in the zoom lens, during zooming from a wide-angle end to a telephoto end, the first lens group moves along a locus having a convex shape toward an image side while decreasing an air space between the first and second lens groups, and the second and third lens groups move toward the object side while increasing an air space therebetween. A surface closest to the object side in the second lens group is convex toward the object side and is aspheric, and the second lens group includes a cemented lens formed of a negative meniscus lens convex toward the object side and a positive lens.

Here, the lens surface closest to the object side in the second lens group strongly refracts off-axis principal rays exiting from the first lens group. Hence, there is adopted an arrangement by which the lens surface is convex toward the object side so as not to cause various off-axis aberrations. Further, this arrangement is also preferable in order to suppress the occurrence of spherical aberration of the on-axis rays diverged from the first lens group and the occurrence of coma aberration of the off-axis rays.

Further, in the zoom lens, the surface closest to the object side in the second lens group is aspheric. Thereby, the zoom lens is able to correct spherical aberration and coma aberration satisfactorily. As a result, the zoom lens has an advantage in that it is easy to obtain a reliable optical performance even when a high magnification power and a wide angle of the optical system are achieved.

Furthermore, in the zoom lens, in order to correct chromatic aberration satisfactorily, the cemented lens formed of the negative meniscus lens and the positive lens in the second lens group is disposed, and the object side surface of the negative meniscus lens is convex toward the object side. In the zoom lens, by adopting such a configuration, the cemented lens easily satisfies a sine condition. As a result, it is possible to reduce the occurrence of spherical aberration and coma aberration.

Furthermore, the cemented lens of the second lens group is configured to satisfy the following conditional expression (1).

$$0.3 < R_{CL}/f2 < 1.0. \tag{1}$$

Here, $R_{CL}$ is a radius of curvature of the cemented surface of the cemented lens constituting the second lens group, and f2 is a focal length of the second lens group.

The conditional expression (1) defines a radius of curvature of the cemented surface of the cemented lens. When the result value of the expression exceeds the upper limit, the radius of curvature of the cemented surface becomes too gentle. In this case, it is difficult to correct longitudinal chromatic aberration and chromatic coma aberration (difference of colors in coma aberration) on the cemented surface. Hence, this case is undesirable.

In contrast, in the conditional expression (1), when the result value of the expression exceeds the lower limit, the radius of curvature of the cemented surface becomes too strong. In this case, as the refractive power thereof increases, the occurrence of longitudinal chromatic aberration and chromatic coma aberration in the second lens group excessively increases, thereby causing deterioration in image quality.

Further, in the zoom lens according to the embodiment of the invention, two lenses constituting the first lens group are configured to satisfy the following conditional expressions (2) and (3).

$$0.3 < (R21-R12)/(R12+R21) < 0.5, \text{ and} \tag{2}$$

$$0.1 < (|Sg21|+|Sg12|)/|f1| < 0.3. \tag{3}$$

Here, R21 is a paraxial radius of curvature of an object side surface of a positive lens in the first lens group, R12 is a paraxial radius of curvature of an image side surface of a negative lens in the first lens group, f1 is a focal length of the first lens group, f($\Delta$sag) value is a value obtained by subtracting a sag amount of an aspheric shape from a sag amount of a paraxial radius of curvature, Sg21 is an f($\Delta$sag) value at an effective diameter position on the object side surface of the positive lens in the first lens group, and Sg12 is an f($\Delta$sag) value at an effective diameter position on the image side surface of the negative lens in the first lens group.

Furthermore, when the effective diameter position on the image side surface of the negative lens in the first lens group is larger than R12, the Sg12 is an f($\Delta$sag) value at a position radially spaced at a distance (corresponding to R12) from an optical axis.

The conditional expression (2) defines a shape factor of an air lens formed between the two lenses of the first lens group. In the conditional expression (2), when the result value of the expression becomes smaller than the lower limit, the curvatures of the surfaces of the air lens become gentle. Thereby, the refractive power thereof decreases, and thus it becomes difficult to downsize the optical system.

Further, in the conditional expression (2), when the result value of the expression exceeds the lower limit, incident angles of rays incident from the object side to the air lens in the vicinity of maximum angle of view tend to increase.

Hence, it becomes difficult to correct various off-axis aberrations while achieving an increase in the imaging field angle.

In contrast, in the conditional expression (2), when the result value of the expression becomes larger than the upper limit, the curvatures of the surfaces of the air lens become too strong. Hence, the occurrence of off-axis aberration increases on the wide-angle end side, and the occurrence of on-axis aberration increases on the telephoto end side. Moreover, it becomes difficult to secure an edge thickness of the positive lens of the first lens group and reduce the sensitivity to eccentricity. Hence, the productivity at the time of manufacturing the zoom lens barrel deteriorates.

The conditional expression (3) defines aspheric shapes formed on the image side surface of the negative lens and the object side surface of the positive lens in the first lens group. In the conditional expression (3), when the result value of the expression exceeds the lower limit, it means that the aspheric shapes of both surfaces of the air lens formed between the negative lens and the positive lens approximates to the spherical surface. In this case, since the correction effect of the aspheric lenses in the first lens group is lost, various off-axis aberrations excessively increase, and, particularly, it becomes difficult to correct astigmatism at the wide-angle end, thereby causing deterioration in optical performance.

Further, in the conditional expression (3), when the result value of the expression exceeds the upper limit, the various aberrations are corrected too much by the aspheric shapes, and thus it becomes difficult to perform the aberration correction based on the first lens group. Moreover, the sensitivity to eccentricity also increases, and thus it becomes difficult to manufacture the zoom lens barrel.

Furthermore, the zoom lens according to an embodiment of the invention has a simple configuration in which the third lens group includes only a cemented lens formed to have a negative refractive power as a whole by cementing a positive lens and a negative lens in order from the object side. With such a configuration, it is possible to downsize the optical system.

In this case, the third lens group is configured to satisfy the following conditional expressions (4) and (5).

$$\nu 3p > 45, \quad (4)$$

$$10 < \nu 3p - \nu 3n < 30, \text{ and} \quad (5)$$

$$1.0 < (R3a + R3b)/(R3a - R3b) < 6.0, \quad (6)$$

Here, $\nu 3p$ is an Abbe number of the positive lens constituting the cemented lens of the third lens group, $\nu 3n$ is an Abbe number of the negative lens constituting the cemented lens of the third lens group, $R3a$ is a radius of curvature of a lens surface closest to the object side in the third lens group, and $R3b$ is a radius of curvature of a lens surface closest to the image side in the third lens group.

The conditional expression (4) defines an Abbe number of a material of the positive lens in the cemented lens constituting the third lens group. The conditional expression (5) defines the difference between the Abbe number of the positive lens and the Abbe number of the material of the negative lens in the cemented lens.

In the third lens group, the material of the positive lens may be selected so that the lower limit of the conditional expression (4) is exceeded or the cemented lens of the third lens group may be configured so that the upper limit of the conditional expression (5) is exceeded. In these cases, the Abbe number of the material of the negative lens excessively decreases. Hence, these cases are undesirable. Generally, in a glass material having a small Abbe number, dispersion increases together with partial dispersion. Hence, particularly in a high power zoom lens, secondary spectrum (secondary dispersion) on the telephoto side tends to increase.

Further, in the third lens group, the cemented lens may be configured so that the lower limit of the conditional expression (5) is exceeded. In this case, the difference between the Abbe numbers of the positive lens and the negative lens excessively decreases. Therefore, there is no merit in the configuration in which the third lens group includes the cemented lens. Hence, this is undesirable.

The conditional expression (6) defines a shape factor of the third lens group. In the third lens group, when the result value of the expression exceeds the upper limit of the conditional expression (6), the curvature of the lens surface may be too strong. In this case, the tilting of the image plane frequently occurs at the time of vibration absorption based on hand shake correction, thereby causing deterioration in image quality.

Further, in the third lens group, when the result value of the expression exceeds the lower limit of the conditional expression (6), the configuration of the cemented lens is inappropriate. Accordingly, it becomes difficult to correct chromatic aberration in the cemented lens in the third lens group.

In addition, in the zoom lens according to an embodiment of the invention, the image can be shifted by moving (shifting) the third lens group in a direction approximately perpendicular to the optical axis.

In practice, by moving the third lens group in the direction approximately perpendicular to the optical axis, the zoom lens is configured to function as an anti-vibration optical system in combination with a detection system which detects image blur, a driving system which shifts the lens groups, and a control system which provides a shift amount to the driving system on the basis of the output of the detection system.

In particular, since the zoom lens is configured to shift the third lens group, which has a small number of elements and has a small lens diameter, in the direction perpendicular to the optical axis, it is possible to downsize an anti-vibration unit, reduce load on the actuator, and save electric power.

Furthermore, in the zoom lens the third lens group is configured to satisfy the above-mentioned conditional expressions (4) to (6). With such a configuration, it is possible to reduce the occurrence of eccentricity aberration caused when the third lens group is shifted. As a result, it is possible to shift an image with small aberration fluctuation.

Furthermore, in the zoom lens according to an embodiment of the invention, the first lens group is configured to include two elements of a negative lens, of which at least an image side surface is aspheric and a concave surface faces toward the image side, and a positive meniscus lens, of which at least an object side surface is aspheric and a convex surface faces toward the object side, arranged in order from the object side, and satisfy the following conditional expressions (7) and (8).

$$n_{d12} > 1.9, \text{ and} \quad (7)$$

$$\nu_{d12} < 22. \quad (8)$$

Here, $n_{d12}$ is a refractive index of the positive meniscus lens constituting the first lens group at the d-line, and $\nu_{d12}$ is an Abbe number of the positive meniscus lens constituting the first lens group.

The conditional expressions (7) and (8) define a refractive index and an Abbe number of the positive meniscus lens constituting the first lens group.

In the zoom lens, when the result value of the expression exceeds the range of the conditional expression (7), it is necessary to increase the curvature of the positive meniscus lens. Thus, it becomes difficult to correct aberration of image field curvature at the wide-angle end, thereby causing deterioration in optical performance. Further, it also becomes difficult to secure the edge thickness of the lenses, thereby causing difficulty in the manufacture of the lens barrel.

Further, in the zoom lens, when the result value of the expression exceeds the range of the conditional expression (8), it becomes difficult to correct chromatic aberration that occurs in the first lens group. As a result, this causes deterioration in optical performance.

Furthermore, in the zoom lens according to an embodiment of the invention, the two lenses constituting the cemented lens of the second lens group are configured to satisfy the following conditional expression (9). With such a configuration, it is possible to correct further chromatic aberration (longitudinal chromatic aberration, chromatic coma aberration) satisfactorily.

$$40 < v2p - v2n < 70. \quad (9)$$

Here, $v2p$ is an Abbe number of the positive lens constituting the cemented lens in the second lens group, and $v2n$ is an Abbe number of the negative meniscus lens constituting the cemented lens in the second lens group.

The conditional expression (9) defines the difference between the Abbe number of the material of the positive lens and the Abbe number of the material of the negative meniscus lens in the cemented lens of the second lens group.

In the zoom lens, the result value of the expression may exceed the upper limit of the conditional expression (9) and excessively increase. In this case, chromatic dispersion increases as the Abbe number of the material of the negative lens excessively decreases, and thus the occurrence of chromatic aberration excessively increases. Hence, this case is undesirable.

Further, in the zoom lens, the result of the expression may exceed the lower limit of the conditional expression (9) and excessively decrease. In this case, the difference between the Abbe numbers of the positive lens and the negative meniscus lens constituting the cemented lens becomes excessively small. Hence, it becomes difficult to correct chromatic aberration.

Furthermore, in the zoom lens according to an embodiment of the invention, it is preferable to perform focusing by moving the first lens group and fourth lens group in the optical axis direction. In particular, by using the fourth lens group as a lens group for focusing, the zoom lens is configured to easily avoid the interference with the driving system which performs driving controls of the shutter unit and the iris unit and the anti-vibration driving system which shifts the third lens group. With such a configuration, the zoom lens can be downsized.

3-2. Configuration of Digital Still Camera

As shown in FIG. 9, the digital still camera 100 equipped with the above-mentioned image capture apparatus includes a camera block 15 that has a function of taking an image, and a camera signal processing section 20 that performs a signal processing such as an analog-to-digital conversion processing on an image signal taken by a camera block 15.

Further, the digital still camera 100 includes an image processing section 30 that performs a process of recording and reproducing the image signal, and an LCD (Liquid Crystal Display) 40 that displays the taken image and the like, and a reader writer 50 that performs writing and reading on the memory card 51.

Furthermore, the digital still camera 100 includes the CPU (Central Processing Unit) 60 that controls the entire camera, an input section 70 that is used for user operation input, and a lens driving control section 80 that controls driving of the lens within the camera block 15.

The camera block 15 has a configuration in which an optical system including the zoom lens 1 or 10 and an image pickup device 12 including, for example, a CCD (Charge Coupled Device) sensor, a CMOS (Complementary Metal Oxide Semiconductor) sensor or the like are combined.

The camera signal processing section 20 is configured to perform signal processes, such as a process of conversion into a digital signal, noise removal, image quality correction, and a process of conversion into luminance and chromatic difference signals, on the output signal which is output from the image pickup device 12.

The image processing section 30 is configured to perform a process of coding for compression and decoding for decompression on an image signal based on a predetermined image data format, a process of conversion of data specification such as resolution, and the like.

The memory card 51 includes a semiconductor memory which is removable. The reader writer 50 is configured to write image data, which is encoded by the image processing section 30, into the memory card 51 and additionally read the image data which is recorded on the memory card 51.

The CPU 60 is configured to control all the circuit blocks within the digital still camera 100, and controls the circuit blocks on the basis of the instruction input signals and the like from the input section 70.

The input section 70 includes, for example, a shutter release button for performing a shutter operation, a selection switch for selecting operation modes, and the like. The input section 70 is configured to output the instruction input signal to the CPU 60 in response to user operation.

The lens driving control section 80 is configured to control a motor, which is not shown in the drawing, for driving the lenses within the zoom lens 1 or 10 on the basis of the control signal from the CPU 60.

Next, operations of the digital still camera 100 will be briefly described. In the digital still camera 100, when the photographing is on standby, an image signal captured by the camera block 15 under the control of the CPU 60 is output to the LCD 40 through the camera signal processing section 20 so as to be displayed as a camera-through-image.

Further, in the digital still camera 100, when the instruction input signal for zooming is input from the input section, the CPU 60 outputs a control signal to the lens driving control section 80, and moves predetermined lenses within the zoom lens 1 or 10 on the basis of the control of the lens driving control section 80.

In the digital still camera 100, when the shutter, which is not shown in the drawing, included in the camera block 15 is clicked by the instruction input signal from the input section 70, the captured image signal is output from the camera signal processing section 20 to the image processing section 30.

In the image processing section 30, the image signal supplied from the camera signal processing section 20 is encoded for compression, and subsequently is converted into digital data of the predetermined data format, and the converted data is written in the memory card 51 through the reader writer 50.

For focusing, the lens driving control section 80 moves, for example, the fourth lens group GR4 within the zoom lens 1 or 10 on the basis of the control signal received from the CPU 60, for example, when the shutter release button is pressed halfway or pressed fully for recording.

For reproduction of image data recorded in the memory card 51, the CPU 60 allows the reader writer 50 to read out the image data from the memory card 51 in response to the operation performed on the input section 70. The readout image data is decoded for decompression in the image processing section 30 and is then outputted to the LCD 40.

The LCD 40 is configured to display a reproduced image on the basis of the image data decoded for decompression by the image processing section 30.

In addition, in the embodiment, the case where the image capture apparatus according to the embodiment of the invention is applied to a digital still camera was described. However, it may also be applied to a different image capture apparatus, for example, a video camera.

4. Other Embodiments

Specific shapes and structures of components and numerical values described or shown in the above-mentioned embodiments and the first and second numerical examples are only illustrative examples of the embodiments for carrying out the invention, and they should not be interpreted as limiting the technical scope of the invention.

Further, in the above-mentioned embodiment, the case of using the single positive meniscus lens L4 as the fourth lens group GR4 was described. However, the invention is not limited to this, and multi-lens configuration or a cemented lens may be used only if it has a positive refractive power.

Furthermore, in the above-mentioned embodiment, the case where the image capture apparatus is mounted on, for example, the digital still camera 100 was exemplified. However, the subject on which the image capture apparatus can be mounted is not limited to this, and may be broadly applicable to various other electronics such as a digital video camera, a mobile phone, a personal computer equipped with a camera, and a PDA provided with a camera.

The present application contains subject matter related to that disclosed in Japanese Priority Patent Application JP 2009-000784 filed in the Japan Patent Office on Jan. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in order from the object side:
a first lens group with a negative focal length;
a second lens group with a positive focal length;
a third lens group with a negative focal length; and
a fourth lens group with a positive focal length,
wherein during zooming from a wide-angle end to a telephoto end, the first lens group moves along a locus having a convex shape toward an image side while decreasing an air space between the first and second lens groups, and the second and third lens groups move toward the object side while increasing an air space therebetween,
wherein a surface closest to the object side in the second lens group is convex toward the object side and is aspheric, and the second lens group includes a cemented lens formed of a negative meniscus lens convex toward the object side and a positive lens,
wherein the cemented lens of the second lens group satisfies the following conditional expression (1):

$$0.3 < R_{CL}/f2 < 1.0, \quad (1)$$

where
$R_{CL}$ is a radius of curvature of a cemented surface of the cemented lens constituting the second lens group, and
f2 is a focal length of the second lens group, and
wherein two lenses constituting the first lens group satisfy the following conditional expressions (2) and (3):

$$0.3 < (R21-R12)/(R12+R21) < 0.5, \text{ and} \quad (2)$$

$$0.1 < (|Sg21|+|Sg12|)/|f1| < 0.3, \quad (3)$$

where
R21 is a paraxial radius of curvature of an object side surface of a positive lens in the first lens group,
R12 is a paraxial radius of curvature of an image side surface of a negative lens in the first lens group,
f1 is a focal length of the first lens group,
f(Δsag) value is a value obtained by subtracting a sag amount of an aspheric shape from a sag amount of a paraxial radius of curvature,
Sg21 is an f(Δsag) value at an effective diameter position on the object side surface of the positive lens in the first lens group, and
Sg12 is an f(Δsag) value at an effective diameter position on the image side surface of the negative lens in the first lens group, or is an f(Δsag) value at a position radially spaced at a distance (corresponding to R12) from an optical axis when the effective diameter position on the image side surface of the negative lens in the first lens group is larger than R12.

2. The zoom lens according to claim 1, wherein the third lens group includes only a cemented lens formed to have a negative refractive power as a whole by cementing a positive lens and a negative lens in order from the object side.

3. The zoom lens according to claim 2, wherein the third lens group includes only the cemented lens formed to have the negative refractive power as a whole by cementing the positive lens and the negative lens in order from the object side, and satisfies the following conditional expressions (4) and (5):

$$v3p > 45, \text{ and} \quad (4)$$

$$10 < v3p - v3n < 30, \quad (5)$$

where
v3p is an Abbe number of the positive lens constituting the cemented lens of the third lens group, and
v3n is an Abbe number of the negative lens constituting the cemented lens of the third lens group.

4. The zoom lens according to claim 3, wherein the lenses constituting the third lens group satisfy the following conditional expression (6):

$$1.0 < (R3a+R3b)/(R3a-R3b) < 6.0, \quad (6)$$

where
R3a is a radius of curvature of a lens surface closest to the object side in the third lens group, and
R3b is a radius of curvature of a lens surface closest to the image side in the third lens group.

5. The zoom lens according to claim 4, wherein the first lens group includes two elements of a negative lens, of which at least an image side surface is aspheric and a concave surface faces toward the image side, and a positive meniscus lens, of which at least an object side surface is aspheric and a convex surface faces toward the object side, arranged in order from the object side, and satisfies the following conditional expressions (7) and (8):

$$n_{d12} > 1.9, \text{ and} \tag{7}$$

$$v_{d12} < 22, \tag{8}$$

where $n_{d12}$ is a refractive index of the positive lens constituting the first lens group at the d-line, and $v_{d12}$ is an Abbe number of the positive lens constituting the first lens group.

6. The zoom lens according to claim 5, wherein the cemented lens of the second lens group satisfies the following conditional expression (9):

$$40 < v2p - v2n < 70, \tag{9}$$

where $v2p$ is an Abbe number of the positive lens constituting the cemented lens in the second lens group, and $v2n$ is an Abbe number of the negative lens constituting the cemented lens in the second lens group.

7. The zoom lens according to claim 6, wherein an image blur correction function for correcting image blur is provided by shifting the third lens group in a direction perpendicular to the optical axis.

8. An image capture apparatus comprising:
a zoom lens; and
an image pickup device converting an optical image formed by the zoom lens into an electric signal,
wherein the zoom lens includes, in order from the object side, a first lens group with a negative focal length, a second lens group with a positive focal length, a third lens group with a negative focal length, and a fourth lens group with a positive focal length,
wherein during zooming from a wide-angle end to a telephoto end, the first lens group moves along a locus having a convex shape toward an image side while decreasing an air space between the first and second lens groups, and the second and third lens groups move toward the object side while increasing an air space therebetween,
wherein a surface closest to the object side in the second lens group is convex toward the object side and is aspheric, and the second lens group includes a cemented lens formed of a negative meniscus lens convex toward the object side and a positive lens, and
wherein the cemented lens of the second lens group satisfies the following conditional expression (1):

$$0.3 < R_{CL}/f2 < 1.0, \tag{1}$$

where $R_{CL}$ is a radius of curvature of a cemented surface of the cemented lens constituting the second lens group, and $f2$ is a focal length of the second lens group, and wherein two lenses constituting the first lens group satisfy the following conditional expressions (2) and (3):

$$0.3 < (R21 - R12)/(R12 + R21) < 0.5, \text{ and} \tag{2}$$

$$0.1 < (|Sg21| + |Sg12|)/|f1| < 0.3, \tag{3}$$

where

R21 is a paraxial radius of curvature of an object side surface of a positive lens in the first lens group, R12 is a paraxial radius of curvature of an image side surface of a negative lens in the first lens group, f1 is a focal length of the first lens group, f(Δsag) value is a value obtained by subtracting a sag amount of an aspheric shape from a sag amount of a paraxial radius of curvature, Sg21 is an f(Δsag) value at an effective diameter position on the object side surface of the positive lens in the first lens group, and Sg12 is an f(Δsag) value at an effective diameter position on the image side surface of the negative lens in the first lens group, or is an f(Δsag) value at a position radially spaced at a distance (corresponding to R12) from an optical axis when the effective diameter position on the image side surface of the negative lens in the first lens group is larger than R12.

9. The image capture apparatus according to claim 8, wherein the third lens group includes only a cemented lens formed to have a negative refractive power as a whole by cementing a positive lens and a negative lens in order from the object side.

10. The image capture apparatus according to claim 9, wherein the third lens group includes only the cemented lens formed to have the negative refractive power as a whole by cementing the positive lens and the negative lens in order from the object side, and satisfies the following conditional expressions (4) and (5):

$$v3p > 45, \text{ and} \tag{4}$$

$$10 < v3p - v3n < 30, \tag{5}$$

where $v3p$ is an Abbe number of the positive lens constituting the cemented lens of the third lens group, and $v3n$ is an Abbe number of the negative lens constituting the cemented lens of the third lens group.

11. The image capture apparatus according to claim 10, wherein the lenses constituting the third lens group satisfy the following conditional expression (6):

$$1.0 < (R3a + R3b)/(R3a - R3b) < 6.0, \tag{6}$$

where

R3a is a radius of curvature of a lens surface closest to the object side in the third lens group, and R3b is a radius of curvature of a lens surface closest to the image side in the third lens group.

12. The image capture apparatus according to claim 11, wherein the first lens group includes two elements of a negative lens, of which at least an image side surface is aspheric and a concave surface faces toward the image side, and a positive meniscus lens, of which at least an object side surface is aspheric and a convex surface faces toward the object side, arranged in order from the object side, and satisfies the following conditional expressions (7) and (8):

$$n_{d12} > 1.9, \text{ and} \tag{7}$$

$$v_{d12} < 22, \tag{8}$$

where $n_{d12}$ is a refractive index of the positive lens constituting the first lens group at the d-line, and $v_{d12}$ is an Abbe number of the positive lens constituting the first lens group.

13. The image capture apparatus according to claim 12, wherein the cemented lens of the second lens group satisfies the following conditional expression (9):

$$40 < v2p - v2n < 70, \tag{9}$$

where $v2p$ is an Abbe number of the positive lens constituting the cemented lens in the second lens group, and ν2n is an Abbe number of the negative lens constituting the cemented lens in the second lens group.

14. The image capture apparatus according to claim 13, wherein an image blur correction function for correcting image blur is provided by shifting the third lens group in a direction perpendicular to the optical axis.

* * * * *